US012657541B2

(12) United States Patent
Mokashi et al.

(10) Patent No.: US 12,657,541 B2
(45) Date of Patent: Jun. 16, 2026

(54) SYSTEM AND METHOD FOR PERFORMANCE MEASUREMENT AND IMPROVEMENT OF BOT INTERACTIONS

(71) Applicant: Nice Ltd., Ra'anana (IL)

(72) Inventors: Abhijit Mokashi, Pune (IN); Amram Amir Cohen, Tel Aviv (IL); Chetan Supekar, Pune (IN); Prasad Patil, Pune (IN)

(73) Assignee: Nice Ltd. (IL)

( * ) Notice: Subject to any disclaimer, the term of this patent is extended or adjusted under 35 U.S.C. 154(b) by 148 days.

(21) Appl. No.: 18/094,037

(22) Filed: Jan. 6, 2023

(65) Prior Publication Data

US 2024/0232772 A1 Jul. 11, 2024

(51) Int. Cl.
*G06Q 10/0639* (2023.01)
*G06Q 30/015* (2023.01)

(52) U.S. Cl.
CPC ....... *G06Q 10/0639* (2013.01); *G06Q 30/015* (2023.01)

(58) Field of Classification Search
CPC ......................... G06Q 10/0639; G06Q 30/015
USPC ....................................... 705/7.38
See application file for complete search history.

(56) References Cited

U.S. PATENT DOCUMENTS

| | | | | | |
|---|---|---|---|---|---|
| 8,553,872 | B2 * | 10/2013 | Geffen | ............. | G06Q 10/06393 |
| | | | | | 379/265.06 |
| 10,303,517 | B1 * | 5/2019 | Sloyan | ................ | G06F 11/3616 |

| | | | | | |
|---|---|---|---|---|---|
| 11,516,094 | B2 * | 11/2022 | Dwivedi | ............. | H04L 41/5048 |
| 2018/0302346 | A1 * | 10/2018 | Xie | ......................... | H04L 67/02 |
| 2018/0322403 | A1 * | 11/2018 | Ron | ......................... | G06N 5/04 |
| 2020/0311209 | A1 * | 10/2020 | Mokashi | .......... | G06Q 10/06398 |
| 2021/0152496 | A1 * | 5/2021 | Kim | ......................... | H04L 51/02 |
| 2022/0046129 | A1 * | 2/2022 | Clodore | ................. | G06Q 10/20 |
| 2022/0210033 | A1 * | 6/2022 | Higgins | ................. | H04L 51/02 |
| 2023/0179708 | A1 * | 6/2023 | Klemm | .............. | H04M 3/5183 |
| | | | | | 379/266.07 |
| 2024/0144558 | A1 * | 5/2024 | Coble | ..................... | G06T 11/26 |

FOREIGN PATENT DOCUMENTS

| | | | | | |
|---|---|---|---|---|---|
| JP | 2021131755 | A | * | 9/2021 | |
| JP | 2023504777 | A | * | 2/2023 | ........... G06Q 30/015 |
| JP | 2024501052 | A | * | 1/2024 | ............. H04L 51/02 |

OTHER PUBLICATIONS

NICE Engage Platform, https://bslgroup.com/call-recording/nice-engage/, printed Jan. 6, 2023.
NICE CXOne, https://www.nice.com/websites/cxone-next-gen-cx/, printed Jan. 3, 2023.

* cited by examiner

*Primary Examiner* — Abdallah A El-Hage Hassan

(57) ABSTRACT

A method and system for evaluating bot performance, including collecting, by a processor, bot performance data items, wherein the collecting includes directly collecting bot performance data items; and calculating bot performance data items based on collected bot performance metrics; producing a bot performance output including bot performance data items; and assessing the bot performance output. Assessment of the bot performance output may initiate bot quality management, wherein the bot quality management includes, assessing the bot update recommendations. Assessment of the bot update recommendations may result in initiating bot update.

17 Claims, 11 Drawing Sheets

200

500

<u>550</u>

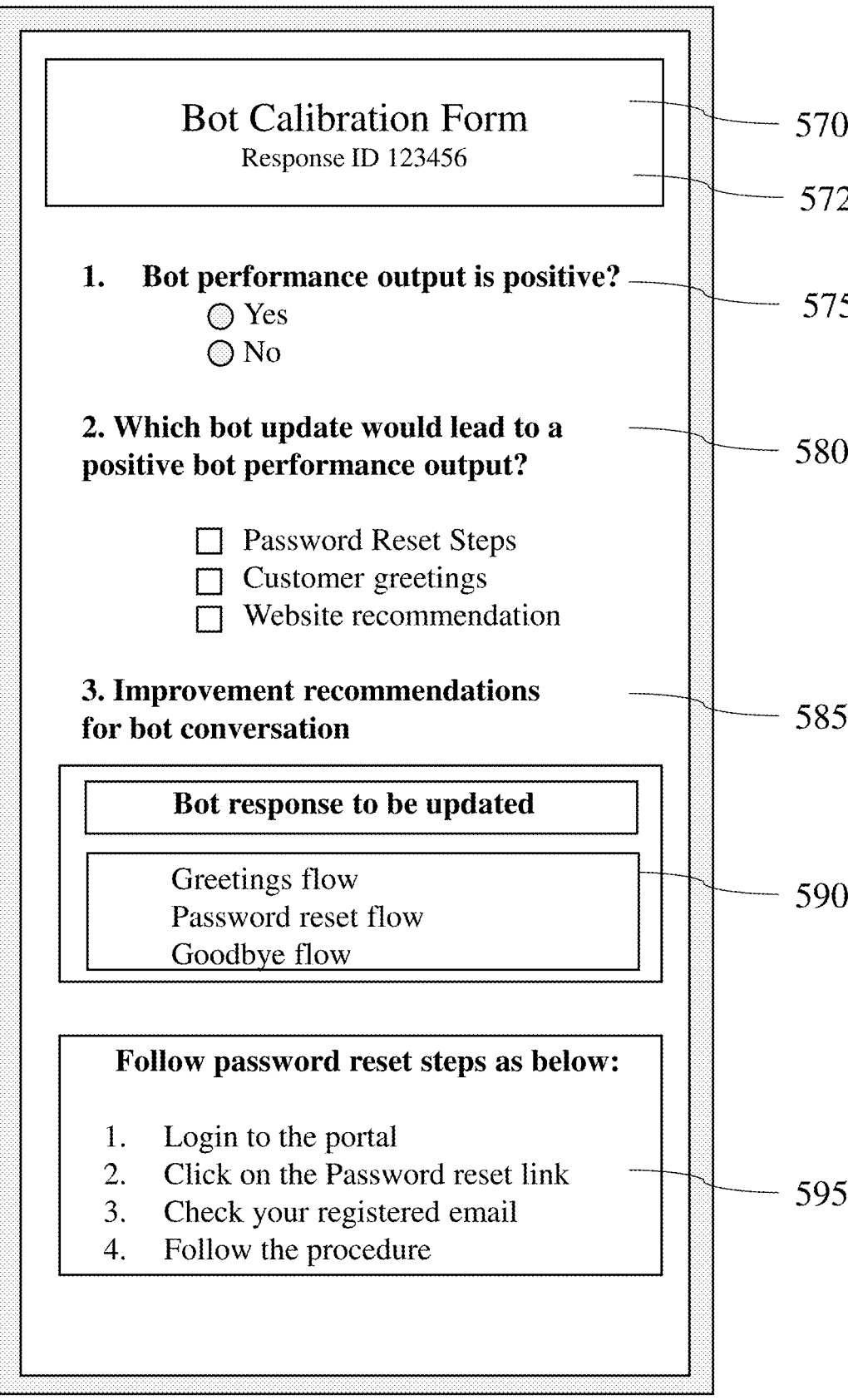

Bot Calibration Form — 570
Response ID 123456 — 572

1.  Bot performance output is positive? — 575
       ○ Yes
       ○ No

2. Which bot update would lead to a positive bot performance output? — 580

☐ Password Reset Steps
       ☐ Customer greetings
       ☐ Website recommendation 3. Improvement recommendations for bot conversation — 585

Bot response to be updated

Greetings flow — 590
Password reset flow
Goodbye flow

Follow password reset steps as below:

1. Login to the portal
2. Click on the Password reset link — 595
3. Check your registered email
4. Follow the procedure

FIG. 5C

SYSTEM AND METHOD FOR PERFORMANCE MEASUREMENT AND IMPROVEMENT OF BOT INTERACTIONS

TECHNICAL FIELD OF THE INVENTION

The present invention relates generally to the assessment of automatic computer process interactions, e.g. bot interactions, and the improvement thereof, more specifically to the collection of metrics for bot interactions and the calculation of bot performance.

BACKGROUND OF THE INVENTION

Computer processes may automatically perform tasks such as holding conversations or producing computer input. Bots are computer processes and programs that may be used, e.g. by businesses, in the communication with customers, e.g. to offer Internet-based services. Commonly, they are used to automate interaction with customers and carry out certain tasks, e.g. provide customer support or interact with customers on websites in the form of chats. Thereby, bots may act as virtual agents and can imitate human activity and may provide customers with information, e.g. bots may provide a customer with information concerning specifications of a certain product. Bots may also be used to allow customers to report problems with a service, e.g. that is used by a customer, e.g. online banking.

There are no effective tools to measure the efficiency of bots or track the success and effectiveness of bots in engaging with a human client. In contrast to the evaluation of human agents, there is no quality management process assessing virtual agents, e.g. bots, and, as a result, conversational flow is not being updated frequently. Due to the limited methods for the evaluation of bots, their operation may lead to a low customer satisfaction, e.g. a low customer satisfaction score (CSAT) or a higher escalation to human agents.

Therefore, there is a need to autonomously evaluate the performance of bots.

SUMMARY OF THE INVENTION

Improvements and advantages may include evaluating bot performance based on a bot performance output generated from collected bot metrics and bot interaction data items and automatically updating a bot, e.g. a bot conversation. Thereby, the assessment of bot performance may be used to generate bot updates based on bot update recommendations.

Embodiments include a performance review for bots and the generation of a bot performance card indicating key performance indicators (KPIs), e.g. customer sentiments, average handling time (AHT) and elevation. Embodiments include a bot evaluation process for measuring the performance of intelligent virtual agents, e.g. bots.

An embodiment may include a method for evaluating bot performance, including: collecting, by a processor, bot performance data items, wherein the collecting includes directly collecting bot performance data items; and calculating bot performance data items based on collected bot performance metrics; producing a bot performance output including bot performance data items; and assessing the bot performance output.

An embodiment may include not updating the bot when the bot performance output is assessed positive. An embodiment may include initiating bot quality management when the bot performance output is assessed negative.

In an embodiment, initiating bot quality management includes: at the processor, retrieving bot update recommendations generated from collected bot interaction data; assessing the bot update recommendations and performing: when the bot update recommendations are assessed negative, the bot is not updated; and when the bot update recommendations are assessed positive, initiate bot update.

In an embodiment, assessing the bot performance output includes assessing the bot performance data items.

In an embodiment, the bot update recommendations are generated from data from a quality management system, wherein the data includes one or more of: manual bot evaluation data, automated bot evaluation data and bot calibration data.

An embodiment may include a system for evaluating bot performance, the system including: a computing device; a memory; and a processor, the processor configured to: collect bot performance data items, wherein collecting includes directly collecting bot performance data items; and calculating bot performance data items based on collected bot performance metrics; produce a bot performance output comprising bot performance data items; and assess the bot performance output.

In an embodiment, the processor is further configured to: perform one of: when the bot performance output is assessed positive, the bot is not updated; and when the bot performance output is assessed negative, initiate bot quality management.

In an embodiment, the processor is further configured to: retrieve bot update recommendations; assess, by the user, the bot update recommendations and perform one of: when the bot update recommendations are assessed negative, the bot is not updated; and when the bot performance is assessed positive, initiate bot update.

An embodiment may include a method of generating bot update recommendations, the method including: retrieving, by a processor, data from a quality management system, wherein the data includes one or more of: manual bot evaluation data, automated bot evaluation data and bot calibration data; evaluating the retrieved data; and generating bot update recommendations.

In an embodiment, the quality management system includes one or more of: an evaluation software, a calibration software and a quality planner software.

These, additional, and/or other aspects and/or advantages of the present invention may be set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5C shows a bot calibration interface for the provision of bot update recommendations, according to embodiments of the present invention.

Figure 1A:
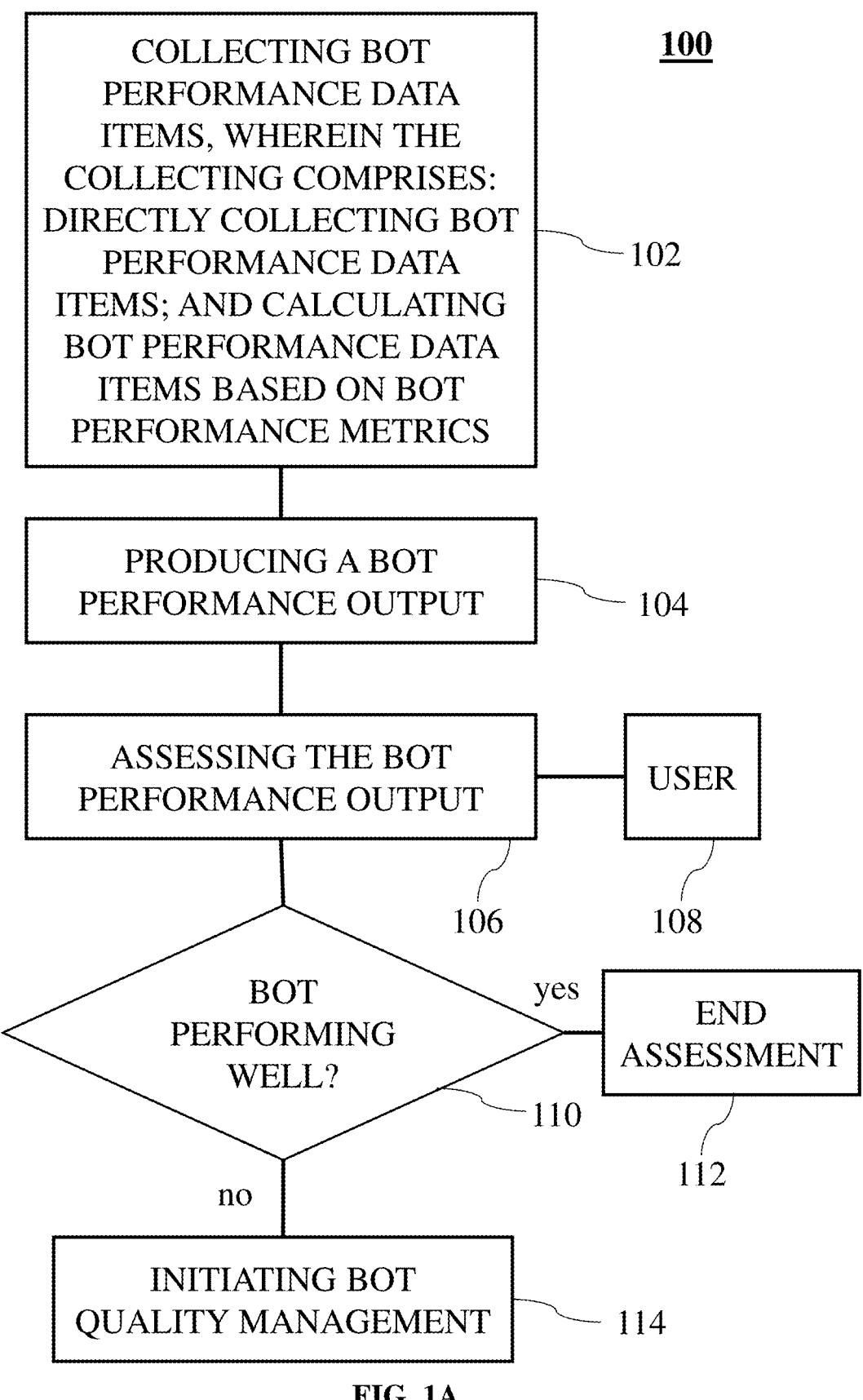
FIG. 1A is a flowchart of a method of evaluating bot performance, according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS
OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

FIG. 1A shows a block diagram of a method 100 for evaluating bot performance. Evaluating bot performance may include measuring success and effectiveness of a bot based on interaction with customers. Bots are software applications that may run automated tasks, e.g. scripts and may be used to imitate human activity. Bots may engage with customers via a website, e.g. accessed using an Internet browser. For example, a bot may be a chat bot and may be part of an application on a website that may provide a service to a customer visiting a website that includes a chat bot. A service offered by a bot can be, for example, answering customer questions related to a product that is displayed on a website. Alternatively, a service offered to a customer by a bot may relate to reporting problems concerning a service offered by a host of a website. E.g. a customer may report problems when using a service provided by a provided a host, e.g. connectivity problems of an Internet connection. Automated software programs other than bots may be used, and bots or programs that perform functions other than interacting with a person may be used.

Figure 4:
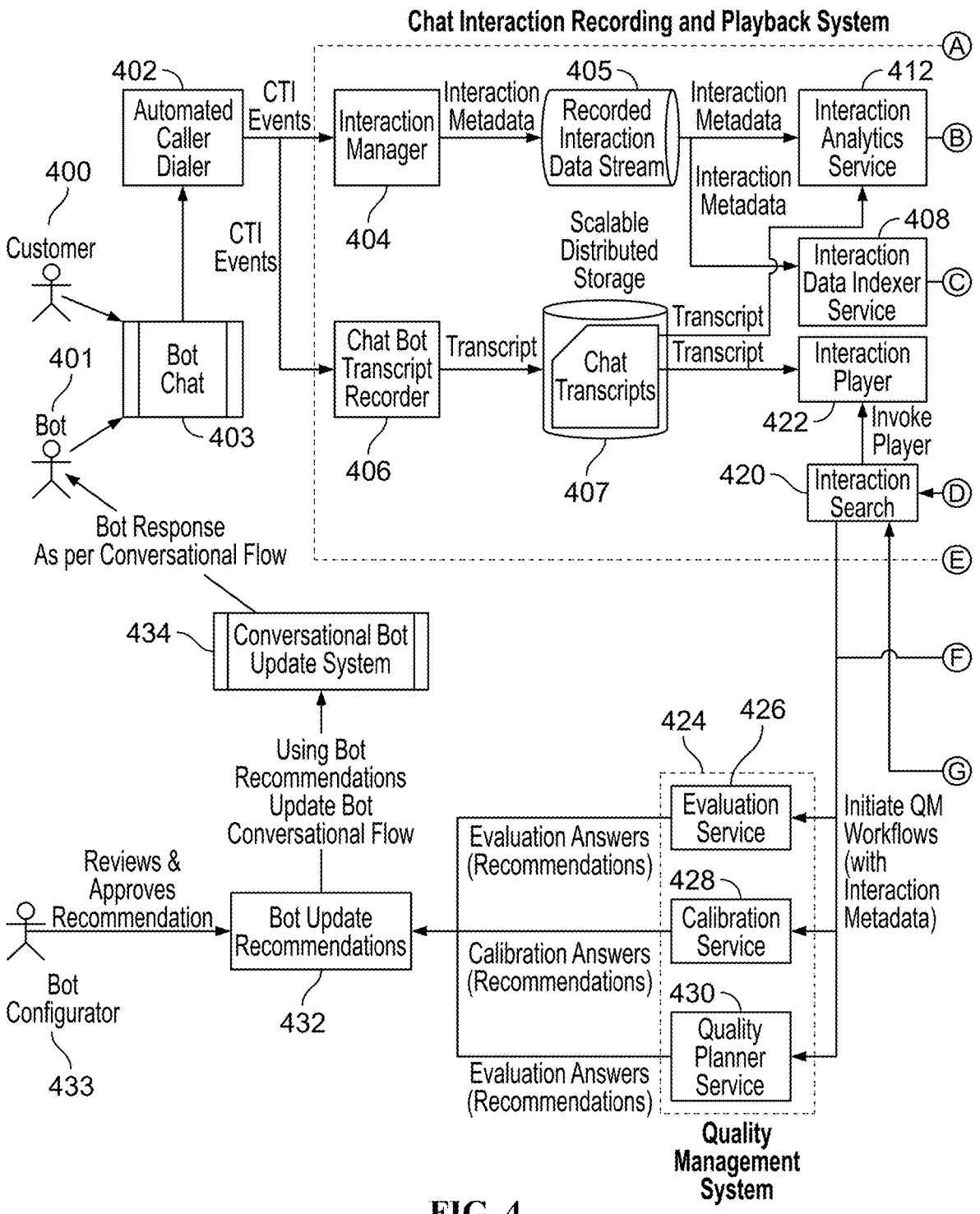
FIG. 4 is a high-level block diagram of the main components of an exemplary system that is required, e.g. for the contact center solution, to record chat bot interaction, according to embodiments of the present invention.
Figure 4:
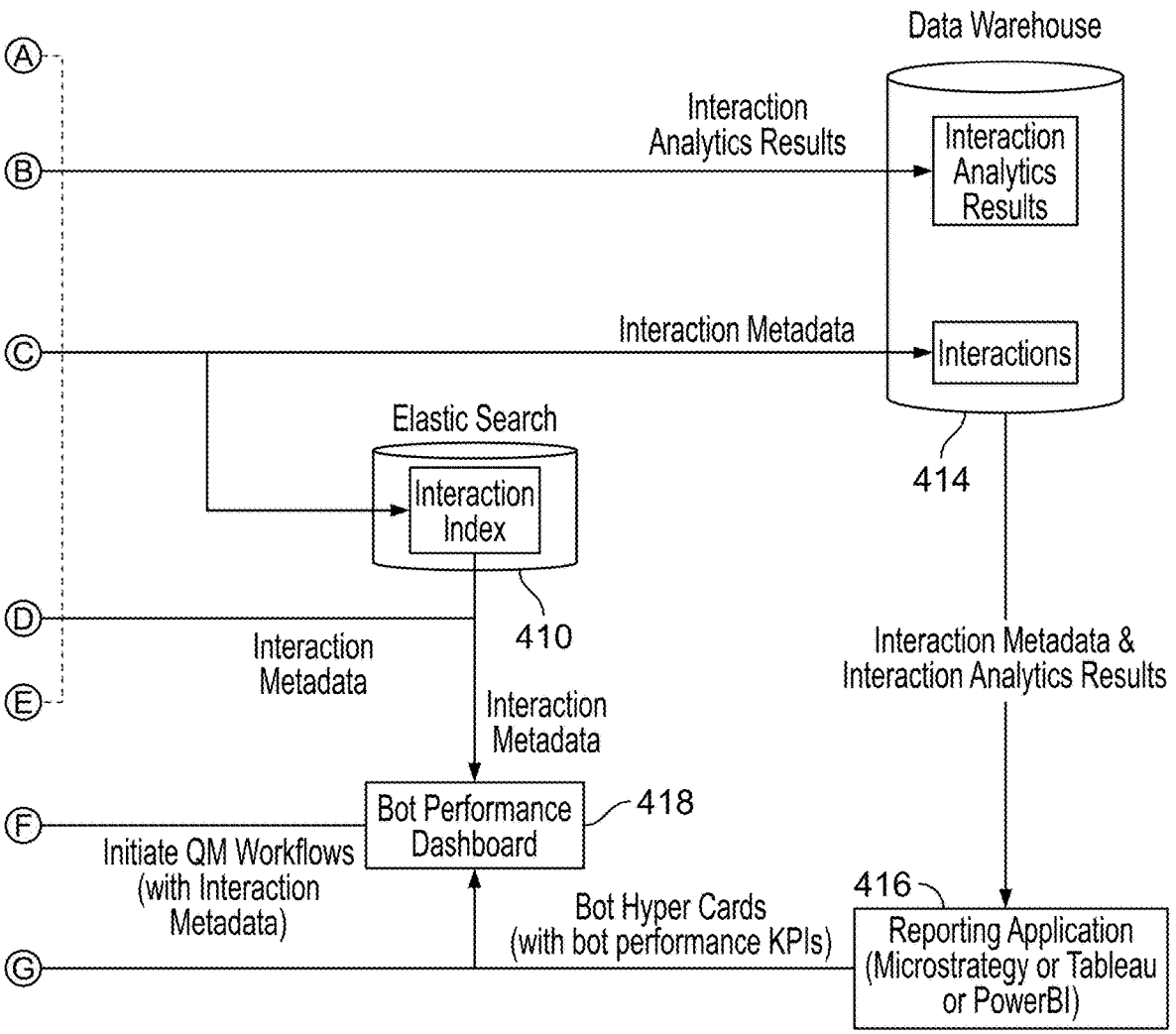

Some embodiments may include collecting, by a processor, bot performance data items, wherein the collecting includes directly receiving or collecting bot performance data items; and calculating bot performance data items based on collected bot performance metrics (step 102). Bot performance data items and/or bot performance metrics may be collected or calculated by an application, e.g. by a chat bot transcript recorder application, from transcripts of customer-bot interactions, e.g. transcripts of chat. For example, interaction transcripts of a connection between a customer and a bot such as a voice call, chat or email, may be analyzed by an interaction analytics service, e.g. interaction analytics application 412 as shown in FIG. 4. An interaction analytics service may determine performance data items and/or bot performance metrics, for example customer sentiments, by identifying keywords or phrases that are indicative for a positive or negative performance of a bot, by comparing a keyword/phrase of an interaction transcript with a database that stores performance data items and/or bot performance metrics, e.g. customer sentiments, for a keyword/phrase. An interaction analytics service may be connected to a database that associates a sentiment to a keyword or phrase. For example, the word "cancel" may be a "neutral sentiment". The provision of keywords or phrases and the association to performance data items and/or bot performance metrics such as customer sentiments within a transcript may be generated by user input, e.g. by an administrator of an interactions analytics service. An interaction analytics service may analyze a transcript of a chat and may record performance data items and/or bot performance metrics, e.g. the occurrence of customer sentiments for a customer bot interaction. Bot performance metrics may be used in the calculation of performance data items for a bot as detailed herein. Bot performance data items and or/bot performance metrics may also be collected during the establishment of a connection between a bot and a customer. A connection between a customer and a bot may be established by a software application, e.g. an automated caller and dialer (ACD) application that connects connection requests such as chat requests by a customer device of a customer to a bot, e.g. a chat bot agent. Software, e.g. an interaction manager software application, may collect bot performance data items and/or bot performance metrics such as interaction metadata during the establishment of a customer bot connection. Interaction metadata may be, for example, an identifier of a chat bot, a time stamp for a start of an interaction between a bot and a customer, customer data, or the duration of a chat between a customer and a bot. Collected bot performance data items and/or bot performance metrics, e.g. interaction metadata may be stored in a database, e.g. a data warehouse. For example, a chat between a customer and a bot may be recorded by software such as a chat bot transcript recorder 406 as shown in FIG. 4 in form of a chat transcript 407. Bot performance data items and/or bot performance metrics of the chat transcript 407 may be collected, e.g. by an interaction manager software, and may be stored in a database, e.g. a chat transcripts database or a data warehouse. Alternatively, after an interaction between a customer and a bot, a customer may be provided with a survey and may rate an interaction with a bot, e.g. whether a bot provided a desired information to the customer, or whether a bot was helpful in solving a problem of a customer. Feedback received by a customer, e.g. in form of a survey, may be received by software, e.g. an interaction manager software, and may either be stored in a database or may be analyzed, e.g. by an interaction analytics service to collect bot performance data items and/or bot performance metrics which may then be stored in a database, e.g. a data warehouse.

Figure 1B:
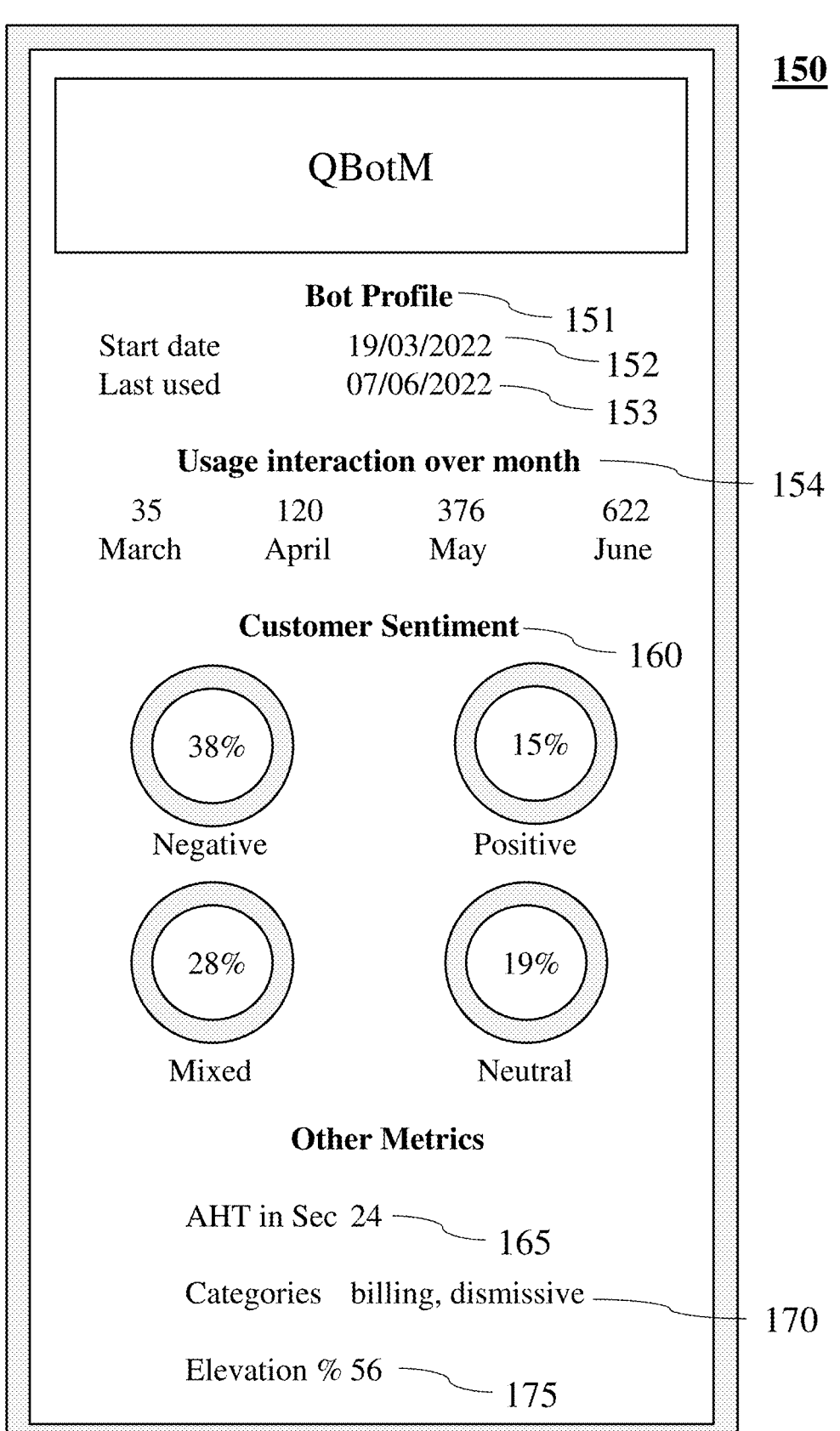
FIG. 1B shows a bot performance output in form of a bot performance dashboard, according to embodiments of the present invention.
Figure 3:
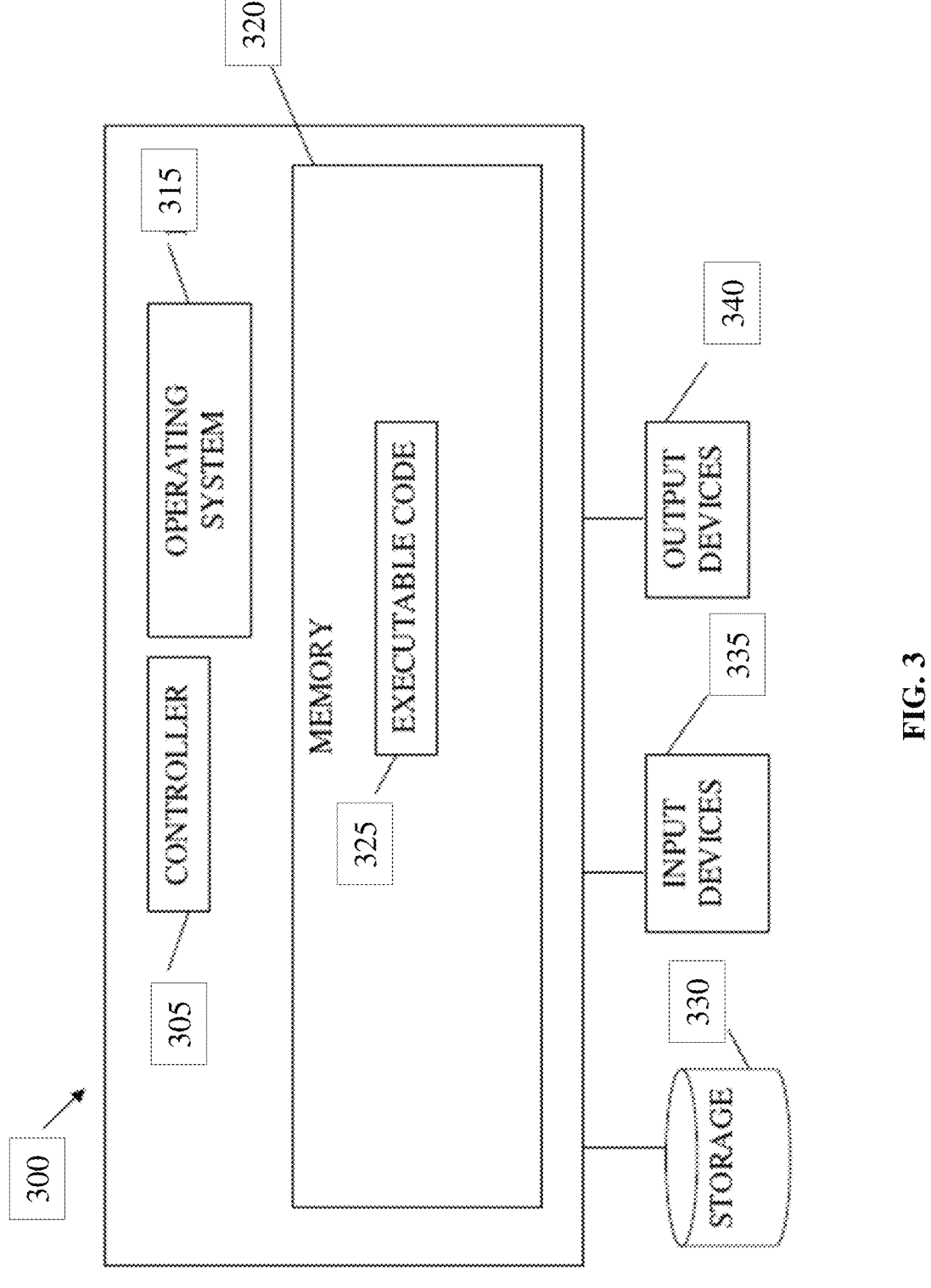
FIG. 3 is a high-level block diagram of an exemplary system, according to embodiments of the present invention.
Figure 5A:
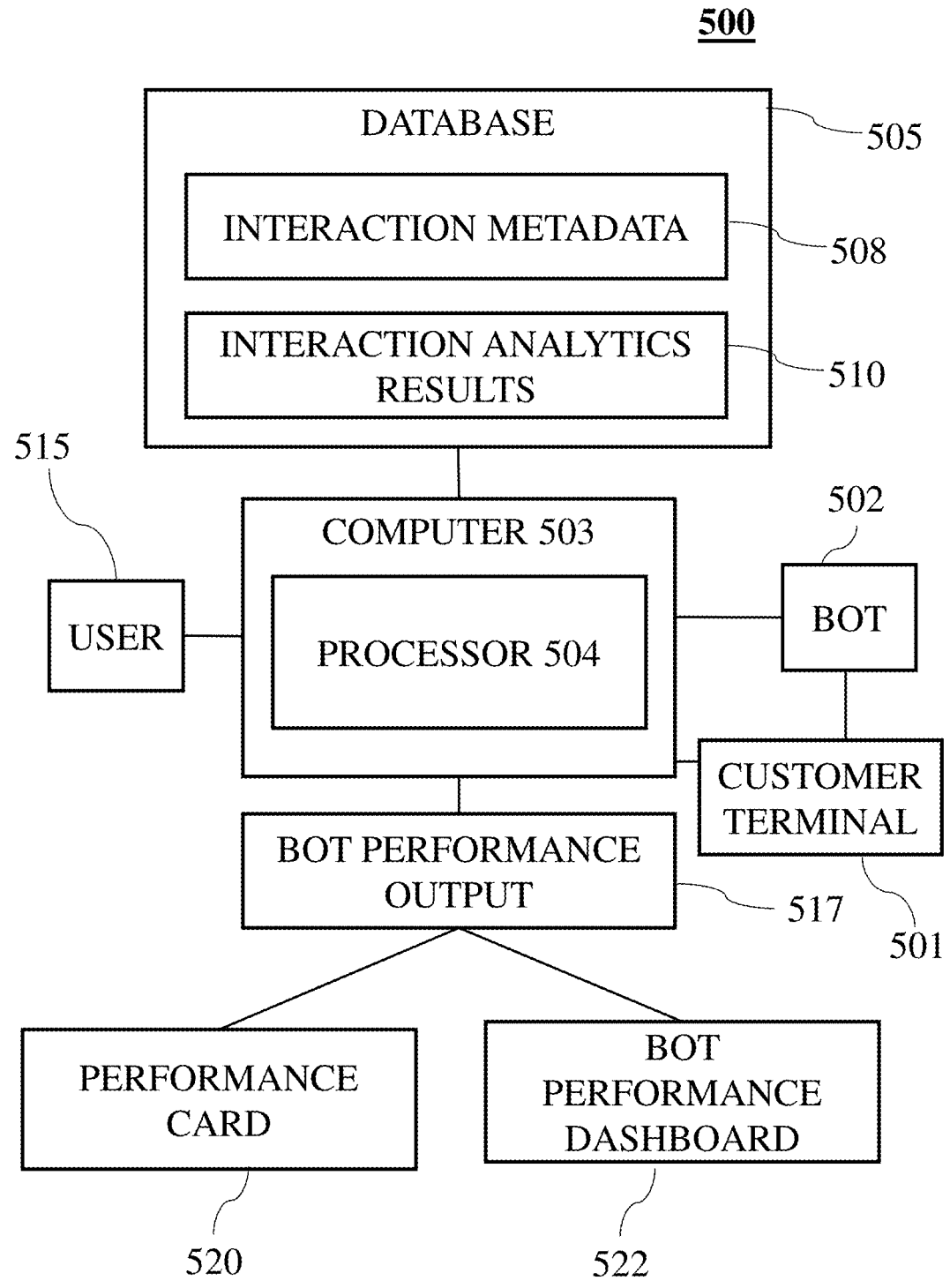
FIG. 5A is a high-level block diagram showing an exemplary system for evaluating bot performance, according to embodiments of the present invention.

Alternatively, bot performance data items may be calculated from directly collected or received bot performance metrics by a processor of the system, e.g. computing device 300 (depicted in FIG. 3). A first set of bot performance data items such as KPIs may be directly collected or and a second set may be calculated or determined from collected bot performance metrics. KPIs may be scores, e.g. values, that allow the comparison of the performance of different bots in view of customer satisfaction and bot efficiency. Bot performance data items, for example KPIs, may be: customer satisfaction score, customer sentiment and analytics categories, number of calls elevated to real agents (elevation %), average handling time (AHT). A customer satisfaction score can be a rating received from a customer after an interaction with a bot, e.g. in a conducted survey after the bot customer interaction. A customer sentiment can be an alternative score for a rating received from a customer after an interaction with a bot, e.g. in a conducted survey after the bot customer interaction. A customer may interact with bots, agents, etc. via for example customer terminal 501 (as shown in FIG. 5A). For example, a customer may use customer terminal 501 to start and speak in interactions (e.g. for telephone calls or video chats), to enter data as part of interactions, to rate interactions, etc. Similarly, a user such as an agent may use a computing device 503, e.g. agent terminal to start and speak in interactions (e.g. for telephone calls or video chats), to enter data as part of interactions, to view rating data such as shown in FIG. 1B, to interact with or modify bots, etc.

An example for a direct collection of a bot performance data item and/or a bot performance metrics, e.g. a KPI, may be a rating by a customer for a bot-customer interaction in form of a customer sentiment collected after a bot-customer interaction, e.g. by an interaction manager software (e.g. collecting customer input from customer terminals 501). A customer sentiment may be a positive, negative, neutral or mixed rating of a customer-bot interaction by a customer depending on the experience of a customer with a bot. In a second example, a bot performance item may relate to or measure a number of calls elevated from a bot to real agents, data which may be detected by, for example interaction manager application 404 or chat bot transcript recorder application 406 (as depicted in FIG. 4) which may be executed by a processor of a computing device such as computing device 503. An elevation of a call from a bot to a real agent may indicate whether a bot can handle a customer bot interaction alone or if a bot requires further assistance by a real agent, e.g. a human agent, for example, because the bot cannot produce an answer to a customer query. An elevated call from a bot to a real agent may be identified from bot performance data items, specifically from interaction metadata.

A bot performance data item and/or bot performance metrics may relate to or measure a handling time of a customer-bot interaction. For example, a bot performance item, e.g. a handling time for a bot-customer interaction, such as a duration of a chat may be collected, e.g. from a chat transcript. Multiple handling times for a specific bot may be collected and an average handling time can be calculated to create a metric which may define an average period of time for a bot customer interaction for a specific bot, e.g. a period of time in which a bot handled a customer query. An average handling time for a bot customer interaction may be regarded as a measure for the efficiency of a bot in providing a customer with an answer to a customer query.

Bot performance data items may be used in the production of a bot performance output (step 104). For example, a bot performance output may include bot performance data items such as bot performance indicators. A bot performance output may be a visual representation of bot performance indicators in form of a performance card or in form of a bot performance dashboard 150 (as depicted in FIG. 1B). Bot performance dashboard 150 may provide (e.g. via computing device 503 such as an agent terminal) a visual representation of a bot performance output for a bot, e.g. bot profile 151 "QbotM". Bot performance dashboard 150 may display bot performance data items: For example, bot performance dashboard 150 may include a start date 151 defining the beginning of the assessment of a bot and an end date 153 defining the end of a period for which a bot was assessed. For a period in which a bot was used, the number of customer interactions 154, for example monthly customer interactions, may be displayed. For example, bot performance dashboard 150 may include bot performance data items in form of performance indicators, e.g. feedback from customers in form of customer sentiment 160. Customer sentiment 160 may show proportional sentiments of customer feedback divided into negative, positive, mixed and neutral customer sentiments. Additionally, bot performance dashboard 150 may include bot performance data items such as "AHT (in seconds)" showing an average handling time of 24 seconds for a customer bot interaction. Bot performance dashboard may also include a bot performance data item referred to as "categories". A "categories" bot performance data item may define a type of bot customer interaction. For example, a bot programmed to deal with queries related to payment enquiries and bills may be defined by the category "billing". Alternatively, a bot may be programmed to engage with a customer in a specific way, e.g. using a certain language or vocabulary, e.g. a dismissive engagement towards a customer. Additionally, a bot performance dashboard 150 may include a bot performance data items such as "elevation %". "elevation %" may relate to or measure a calculated bot performance data item, based on the number of calls elevated from a bot to real agents and may be calculated as the ratio of elevated calls to the number of all calls a bot has been connected to over a certain time period. A user may access or view a bot performance output, e.g. in form of a performance card or a bot performance dashboard, and may assess the performance of a bot. A bot performance output may then be assessed (step 106), e.g. by a user (108). In an alternate embodiment, a bot may be automatically assessed by a computer system, e.g. using computer system 300, based on several bot performance data items of a bot performance output.

Depending on the outcome of an assessment of a bot performance output a bot may be updated or not updated (step 110). When a bot performance output is assessed positive, a bot may not be updated and a bot assessment may end (step 112). When the bot performance output is assessed negative, bot quality management may be initiated (step 114). In this context, updating of a bot may relate to or measure amending source code or a script of a bot. Thus, the processor may be configured not to update the bot when the bot performance output is assessed positive. Alternatively, the processor may be configured to initiate bot quality management when the bot performance output is assessed negative.

Figure 2:
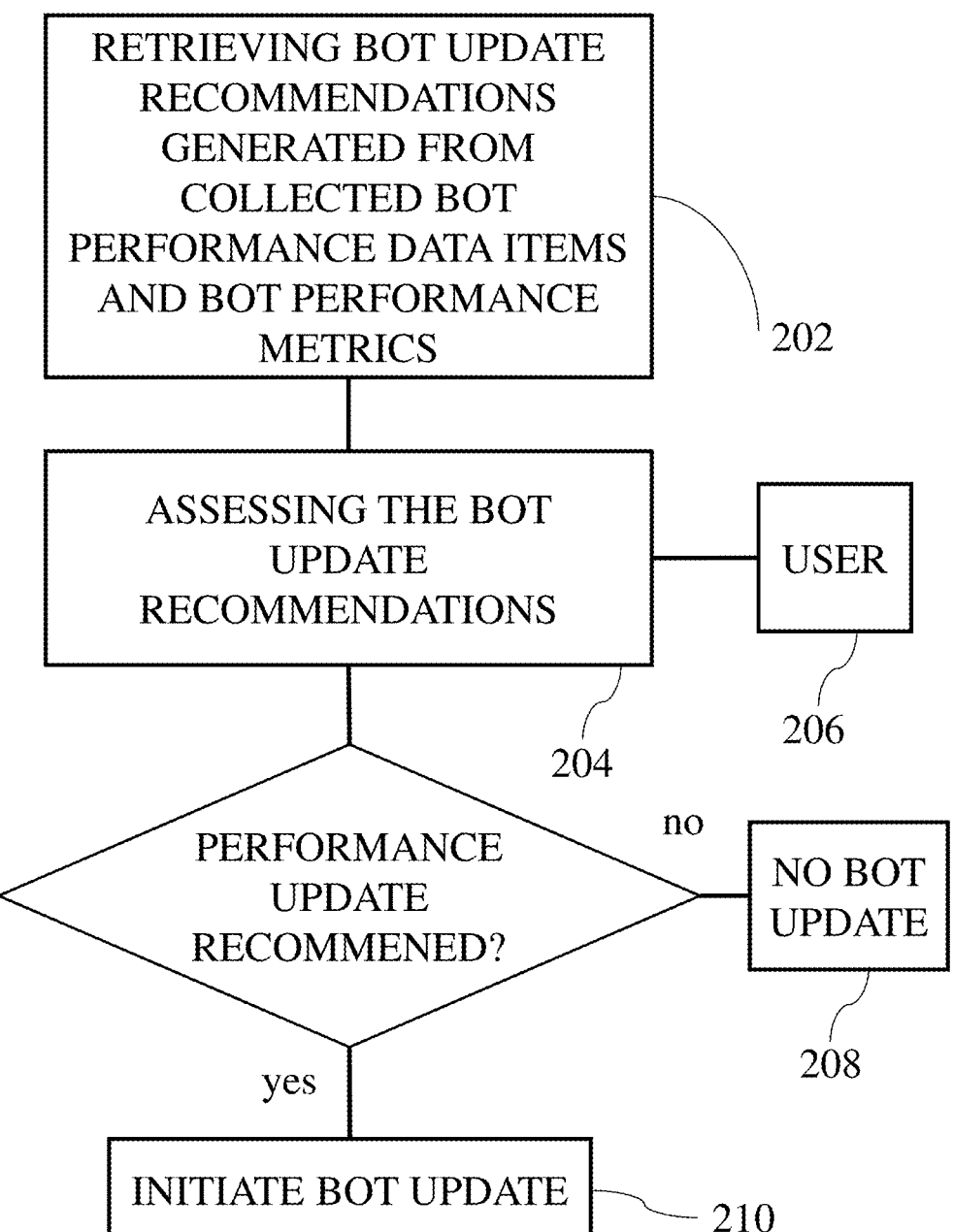
FIG. 2 is a flowchart of a method of initiating bot quality management, according to embodiments of the present invention.

FIG. 2 is a flowchart of a method of initiating bot quality management. In one embodiment, initiating bot quality management includes, at a processor, retrieving bot update recommendations generated from bot performance data items and bot performance metrics (step 202). In some embodiments, the processor is configured to retrieve bot update recommendations.

Bot update recommendations may be generated for example by: retrieving, by a processor such as a processor of computing device 300, data from a quality management system, wherein the data includes one or more of: manual bot evaluation data, automated bot evaluation data and bot calibration data; evaluating, by a user, the retrieved data; and generating bot update recommendations.

Bot update recommendations may be generated via a quality management system. Quality management recommendations may be generated automatically, e.g. via an evaluation service, a calibration service and a quality planner service. For example quality management recommendations may be generated from manual bot evaluation data, automated bot evaluation data and bot calibration data. Alternatively, bot updated recommendations may be generated by a user, for example an experienced human agent.

In one embodiment, update recommendations may be assessed by a user (step 206), for example experienced bot managers (step 204). Alternatively, a processor is configured to assess bot update recommendations.

When bot update recommendations are assessed negative, the bot may not be updated. Alternatively, when the bot update recommendations are assessed positive, a bot update is initiated by a user. In an alternate embodiment, the bot may be assessed by a computer system, e.g. using computer system 300. A processor of a computer system, e.g. computer system 300, may configured to assess bot update recommendations and perform one of: when the bot update recommendations are assessed negative, the bot is not updated (step 208); and when the bot performance is assessed positive, initiate bot update (step 210). A bot may be updated by a user, e.g. a manager, using a bot builder system. A bot builder system may be a software application that allows a user to define the behavior of a bot in interactions between a bot and a customer, e.g. a user may configure a bot, to handle specific customer queries. Alternatively, a bot may be updated automatically by a bot builder system, e.g. by a computer system 300 (depicted in FIG. 3) executing a bot builder system.

FIG. 3 shows a high-level block diagram of an exemplary computing device which may be used with embodiments of the present invention.

A system as disclosed herein may include a computing device, e.g. computing device 300; a memory; and a pro-cessor. A processor may be configured to collect bot performance data items. Alternatively, a processor may be configured to collect bot performance metrics. A processor may be configured to calculate bot performance data items based on collected bot performance metrics. Alternatively, a processor may be configured to collect bot performance data items, wherein collecting includes directly collecting bot performance data items; and calculating bot performance data items based on bot performance metrics. In one embodiment, a processor may be configured to produce a bot performance output comprising bot performance data items. In another embodiment, a processor may be configured to assess a bot performance output. In some embodiments, the processor, e.g. a processor part of computing device 300, may also be configured to perform one of: when the bot performance output is assessed positive, the bot is not updated; and when the bot performance output is assessed negative, initiate bot quality management. The processor may be configured to: retrieve bot update recommendations; assess the bot update recommendations and perform one of: when the bot update recommendations are assessed negative, the bot is not updated; and when the bot performance is assessed positive, initiate bot update. In an alternate embodiment, a bot may be updated or created automatically, e.g. using computer system 300.

Computing device 300 may include a controller or processor 305 that may be, for example, a central processing unit processor (CPU), a chip or any suitable computing or computational device, an operating system 315, a memory 320, a storage 330, input devices 335 and output devices 340 such as a computer display or monitor displaying for example a computer desktop system. Each of modules and equipment and other devices and modules discussed herein, e.g. a server, customer terminal 501, computing device 503, bot creation software or modules, sentiment determination modules, the computer systems and modules in FIGS. 4, 5A, 5B, etc. may be or include, or may be executed by, a computing device such as included in FIG. 3 although various units among these modules may be combined into one computing device.

Operating system 315 may be or may include any code segment designed and/or configured to perform tasks involving coordination, scheduling, arbitration, supervising, controlling or otherwise managing operation of computing device 300, for example, scheduling execution of programs. Memory 320 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 320 may be or may include a plurality of, possibly different memory units. Memory 320 may store for example, instructions (e.g. code 325) to carry out a method as disclosed herein, and/or data.

Executable code 325 may be any executable code, e.g., an application, a program, a process, task or script. Executable code 325 may be executed by controller 305 possibly under control of operating system 315. For example, executable code 325 may be one or more applications performing methods as disclosed herein, for example those of FIGS. 2A-3B according to embodiments of the present invention. In some embodiments, more than one computing device 300 or components of device 300 may be used for multiple functions described herein. For the various modules and functions described herein, one or more computing devices 300 or components of computing device 300 may be used. Devices that include components similar or different to those included in computing device 300 may be used, and may be connected to a network and used as a system. One or more processor(s) 305 may be configured to carry out embodiments of the present invention by for example executing software or code. Storage 330 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data may be stored in a storage 330 and may be loaded from storage 330 into a memory 320 where it may be processed by controller 305. In some embodiments, some of the components shown in FIG. 3 may be omitted.

Input devices 335 may be or may include a mouse, a keyboard, a touch screen or pad or any suitable input device. It will be recognized that any suitable number of input devices may be operatively connected to computing device 300 as shown by block 335. Output devices 340 may include one or more displays, speakers and/or any other suitable output devices. It will be recognized that any suitable number of output devices may be operatively connected to computing device 300 as shown by block 340. Any applicable input/output (I/O) devices may be connected to computing device 300, for example, a wired or wireless network interface card (NIC), a modem, printer or facsimile machine, a universal serial bus (USB) device or external hard drive may be included in input devices 335 and/or output devices 340.

Embodiments of the invention may include one or more article(s) (e.g. memory 320 or storage 330) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

FIG. 4 is a high-level block diagram of an exemplary system, for example used in a contact center to record chat bot interaction between a customer 400, e.g. using customer terminal 501 (as depicted in FIG. 5A) and a bot, e.g. bot 401 (as depicted in FIG. 4) or bot 502 (as depicted in FIG. 5A), according to embodiments of the present invention. A customer or other user may generate input, e.g. in form of text messages such as a rating for a bot customer interaction or audio messages such as a phone call, collected by customer terminal 501. Main services main services involved in the system are depicted in FIG. 4. While a bot 401 is described in FIG. 4, other automatic computer processes may be used.

A bot chat interface 403 may be an interface that is displayed to a customer, e.g. on a website (e.g. at a customer terminal 501), and may allow a customer to interact with a bot. In an embodiment, the interface is also used by a human agent to interact with a customer (e.g. via computer terminal 503), if an interaction is escalated to a human agent. Messages received by a bot chat interface may be used by a bot conversational builder system to generate reply messages for a bot. Reply messages for a bot may be configured by a user, e.g. bot configurator 433. Reply messages for a bot may include a unique identifier that allows linking a recommendation, e.g. generated by a user, to a bot reply message. For example, a quality management system may link a recommendation by a user, e.g. bot configurator 433 to a bot reply message.

An automated caller dialer 402 (ACD) is a software application that can accept incoming chat interactions and may assign them to a bot 401, e.g. a chat bot agent. An ACD 402 may send computer telephone integration (CTI) events to an interaction manager (IM) 404.

CTI events may be interactions between a bot 401 and a customer 400 and may generate bot performance data items and/or bot performance metrics during the establishment of chat interaction between a customer and a bot such as bot performance data items and/or bot performance metrics related to bot customer connection, incoming messages, disconnects, etc.

IM 404 may be a service that may record co-ordinate the recording flow according to the events that it gets from the ACD system 402. IM 404 may generate bot performance data items and/or bot performance metrics, such as interaction metadata, from CTI events and may send recorded bot performance data items and/or bot performance metrics to a database, e.g. an interaction data stream 405, after an interaction between a bot 401 and a customer 400 is complete, e.g. after a disconnect of a bot customer interaction. For example, an interaction manager service may generate bot performance data items and/or bot performance metrics in form of interaction metadata which may include attributes such as chat bot identifier, customer info, interaction start timestamp, duration of the interaction, interaction end timestamp, skills.

A chat bot transcript recorder 406 is a service that may record transcripts 407 of bot customer interactions such as CTI events, e.g. recordings of messages sent and received by chat bot 401. A recorded transcript file may be uploaded to a database, e.g. a scalable distributed storage device using a suitable protocol such as file transfer protocol (FTP) or hypertext transfer protocol (HTTP).

An interaction data indexer application 408 may upload bot performance data items and/or bot performance metrics, e.g. interaction metadata to a database, e.g. database 410. Database 410 may support searches within bot performance data items and/or bot performance metrics, e.g. in an elastic search and makes bot performance data items and/or bot performance metrics searchable for applications. An interaction data indexer application 408 may also transmit bot performance data items and/or bot performance metrics, e.g. in form of interaction metadata, to a database, e.g. a data warehouse.

An interaction analytics application 412 may analyze chat interactions and may use natural language processing to calculate or generate bot performance metrics that may be used in the calculation of bot performance data items, e.g. KPIs such as customer sentiments, analytics categories, customer behavior scores. Interaction analytics application 412 may also store calculated bot performance data items, e.g. KPIs in a database 414, e.g. a data warehouse.

A data warehouse (such as provided by the Snowflake cloud computing service) is a database 414 that may provide storage for all applications of a system, e.g. a contact center. A data warehouse may provide data for reporting applications 416 to produce a bot performance output.

A reporting application 416 such as MicroStrategy, or Tableau or Power bot interaction reporting application or any in-house reporting application can run analytics queries on a database 414, e.g. data warehouse, to produce a bot performance output for a bot, for example to evaluate bot performance. A reporting application 416 may produce a bot performance output in form of a bot performance dashboard 418.

A bot performance dashboard 418 may be an application that may display a bot performance output to a user, e.g. in a user interface, and may allow a user to assess the bot performance output, e.g. by evaluating bot performance data items, e.g. in the form of visualizations such as pie charts, line graphs or heatmaps.

An interaction search 420 may be a service that may allow to display customer interactions to a user, e.g. customer interactions with human agents or with bots, e.g. chat bots. The interaction search may allow to review bot performance data items, e.g. interaction metadata or bot performance output, e.g. the chat bot performance produced by a reporting application.

An interaction player 422 may display a recorded transcript to a user.

A quality management system 424 may be an application that may initiate bot quality management. For example, the application may support different quality management flows, e.g. used in contact centers, such as manual and automated evaluations and calibration. A user, e.g. an experienced manager, may use a quality management system to review chat transcripts, evaluate the chat interaction by submitting score and suggest improvements, generate the bot update recommendations. The quality management system may generate the score and bot script update recommendations in the form of comments and text inputs taken by users 433, e.g. experienced agents. These bot script recommendations may suggest how efficiently the bot could have answered customer queries to improve customer experience. Bot script update recommendations can be used by users 433, e.g. bot configurators, to update bot script configurations. A bot conversation evaluation form may allow a user, e.g. an experienced manager, e.g. using computer terminal 503, to provide bot update recommendations for a bot, e.g. by recommending an update for a reviewed bot response and/or reviewing a performance card e.g. a bot performance dashboard 150. A bot update recommendation may be generated for one or more bot response messages. A conversational bot builder system may update the bot conversational flow based on the bot update recommendation.

An evaluation service 426 may initiate and manage bot quality management, e.g. evaluation workflows in the evaluation of chat interactions.

A calibration service 428 may initiate and manage bot quality management, e.g. calibration workflows. In a calibration process, recorded bot interactions between a bot and a customer are assessed by one or more users, for example by human agents/experts using assessment/evaluation form. Each user may provide input to computer system 503 to evaluate provided bot customer interaction data, e.g. answers provided to a customer query by a bot. Examples of considerations or questions to the user for the evaluation process of a bot by a user include: Did the bot greet a customer? Did the bot identify a customer? Did the bot ask the customer for relevant details for an interaction? Did the bot follow a compliance process, e.g. not asking for credit card details? Did the bot provide a solution to the problem? In addition, users may provide input on how a human customer agent would have responded to a customer interaction. Evaluation input by the real agents may provide a bot configurator with suggestions how to update a bot conversation flow.

A quality planner service 430 may automate the selection and initiation of evaluation workflow. For example, quality planner service 430 may prompt the evaluation service 426 to initiate the evaluation workflow.

A conversational bot builder system 434 may be a chat bot management system that supports configuration of a bot, e.g. a chat bot, to handle various customer queries, and updating a bot, e.g. based on bot update recommendations 432. A bot builder system 434 may enable creating bots or virtual agents without programming expertise. For example, simply by carrying out a conversation with a bot a bot builder system 434 may create a working bot. Bots or other automated systems created by the conversational bot builder may be configured to carry out for example: answering common questions; helping a customer change their information in the system or gather information before transferring to a live agent.

Bot update recommendations, e.g. recommendations 585, 590 and 595 for a bot conversation, generated by a quality management system, e.g. by a user assessing a bot performance output using a bot calibration form as shown in FIG. 5C, may be received by the conversational bot builder system. Bot update recommendations may include a unique identifier to link a bot reply message of a particular bot conversational flow used by a bot builder system to a bot update recommendation. Bot update recommendations may be automatically sent to a user 515 as a notification, e.g. a bot configurator, e.g. via computer terminal 503. User 515 can assess/review and approve bot update recommendations using a bot builder system. Once a bot update recommendation is approved, e.g. by user 515, a conversational flow for a corresponding bot is automatically updated and the bot response is changed automatically.

FIG. 5A is an exemplary system 500 for evaluating bot performance, according to embodiments of the present invention. Bot interaction data items and/or bot performance metrics, e.g. a transcript of an interaction between a bot 502 and a customer terminal 501 of a customer, may be recorded, for example by a chat bot transcript recorder using a computer device such as computer device 503, and may be stored on a database 505, e.g. a chat transcripts data base. In an embodiment, customers may report a bot that did not provide a desired response in a bot customer interaction via a user interface that may be transmitted in form of interaction metadata to a software, e.g. an interaction analytics service. Additionally, collected bot performance data items and/or bot performance metrics, such as transcripts and interaction metadata 508, may be used by software, e.g. an interaction analytics service, to generate fact tables and attributes, e.g. in form of interaction analytics results 510 for the calculation of bot performance data items. They may be used in the production of a bot performance output (e.g. pot performance output 150 shown in FIG. 1B), as outlined in step 102 of FIG. 1. An interaction analytics service may e.g. be executed by processor 504 of computer 503. Calculation of bot performance data items may include, for example, calculation of KPIs. Bot performance data items, such as interaction analytics results 510 and interaction metadata 508, may be stored in a database 505, e.g. a data warehouse. Dissatisfaction by a customer related to an observed bot interaction may be received by interaction analytics service and may be used in the calculation of bot performance data items as outlined below. For example, dissatisfaction may be determined in the case that a customer asked a bot to receive help because he forgot a password for a website, and instead of providing the customer with a website link to a website where the customer could change the password, the customer (e.g. via customer terminal 501) received a website link to the home page of a website and a customer reported the interaction between a bot and a customer as unsuccessful.

A bot performance output may be based on collected bot interaction data items and calculated bot interaction data items, e.g. bot performance indicators, that may be calculated from bot performance metrics. A bot performance score card, e.g. performance card 520, or a bot performance dashboard, e.g. bot performance dashboard 522, representing bot performance data of a bot is shown that may include calculated bot performance indicators (e.g. KPIs). A bot performance score card 520 or dashboard 522, e.g. a bot performance dashboard as depicted in FIG. 1B, may be displayed to a user or agent, e.g. user or agent 515, and may allow a user to assess bot performance data items of a bot and may allow a user to produce a bot performance output 517.

Bot performance data items may be used to produce a bot performance output 517, that can be assessed by a user 515, e.g. a manager of a bot. User 515 may assess bot performance data items of a bot performance output. Alternatively, a user may assess bot performance data items stored in a database, e.g. a data warehouse, using a bot performance dashboard interface. A user may assess a bot by reviewing bot performance data items, e.g. bot performance indicators. Based on the review of bot performance data items, a user may also directly review customer interactions which were not resolved by the bot and for which negative feedback has been received from a customer. Negative feedback from a customer may be identified by assessing bot performance data items, e.g. a customer sentiment value. Bot performance data items may be used to produce a bot performance output 517 that may be displayed to a user. In an embodiment, when a bot performance output is assessed positive, a bot may not be updated.

In an embodiment, when a bot performance output is assessed negative, a bot quality management is initiated by the user. In an alternate embodiment, assessing the bot performance data, may be carried out automatically, e.g. using computer system 503, and a bot performance output 517 is automatically generated from assessed bot performance data.

Figure 5B:
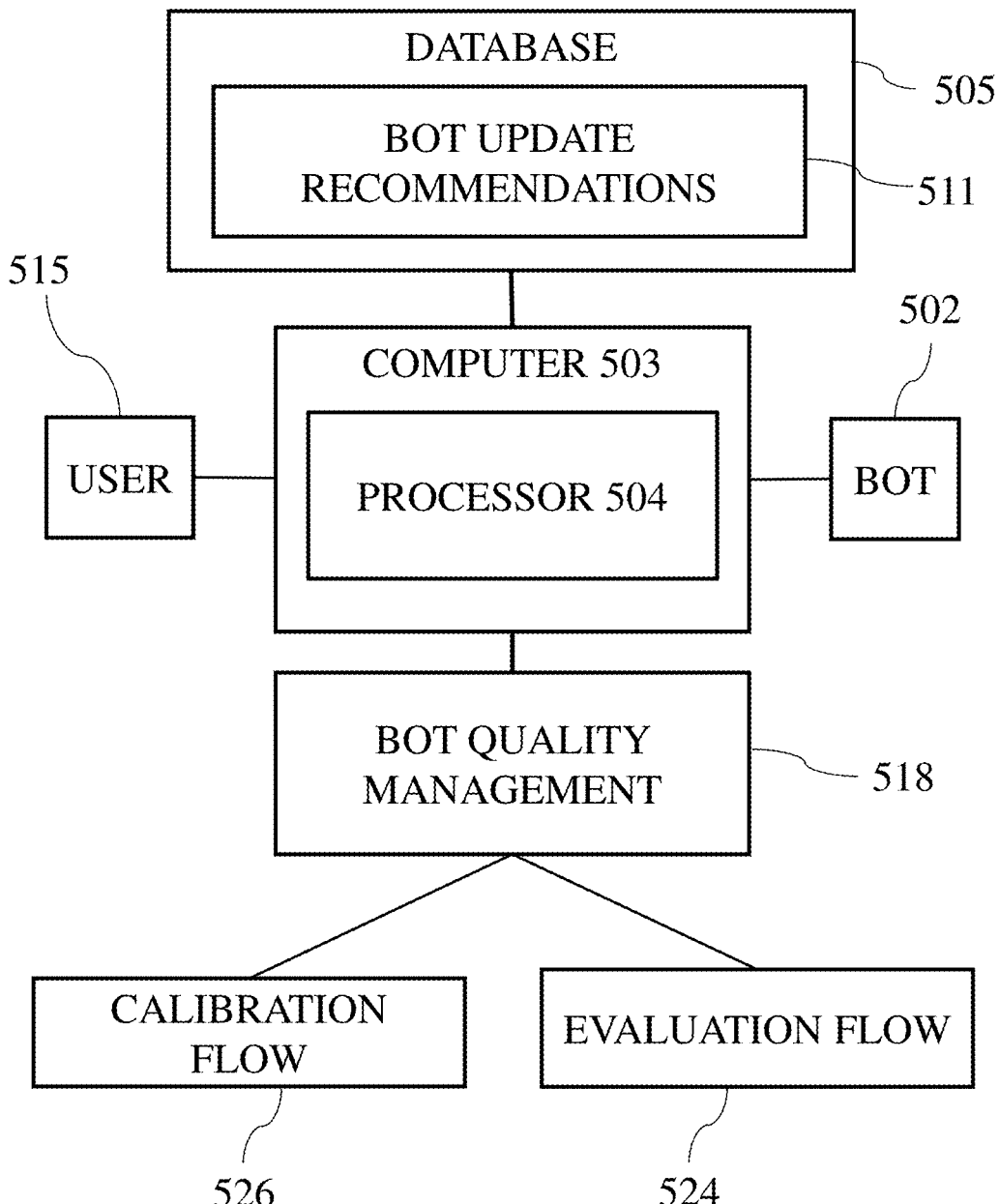
FIG. 5B is a high-level block diagram showing an exemplary system for initiating bot quality management, according to embodiments of the present invention.

When a bot performance output is assessed negative, a bot quality management is initiated by a user such as an agent, e.g. user 515, via computing device 503. FIG. 5B shows an exemplary system 550 for initiating bot quality management, according to embodiments of the present invention. A bot quality management may include, at the processor, retrieving bot update recommendations 511 generated from collected bot interaction data and/or bot performance metrics. In an embodiment, bot update recommendations 511 may be automatically generated from bot interaction data items, e.g. using computer system 503. Alternatively, an example, a user 515 decides to run an evaluation flow 524 or a calibration flow 526. In the evaluation flow, a user 515 may review bot performance output 517, e.g. to identify a bot update. In the calibration flow 526, a user may send an interaction to a plurality of users, e.g. multiple experienced agents. Calibration flow 526 may be part of a bot quality management 518. In calibration flow 526, a customer interaction with a bot, e.g. a transcript of an interaction between a customer and a bot, may be sent to a plurality of users. A plurality of users may generate bot update recommendations 511 from collected bot interaction data items. A plurality of users, e.g. multiple experienced agents, may provide bot update recommendations in a bot calibration form 570 (e.g. by input to computer system 503) as shown in FIG. 5C: A bot calibration form may be an interface that allows to assess a bot performance output by a user, e.g. an agent, and is linked to a customer-bot interaction, e.g. a response message of a bot, by a unique identifier 572, e.g. response ID 572. A bot calibration form may include an assessment 575 of a bot performance output 517 and recommendations for a bot update 580 and recommendations for a bot conversation 585. A bot calibration form may also include an option to select a specific bot response 590 to be updated and to provide an updated bot response 595 for bot response 590, e.g. an amended response message in a customer bot interaction. Bot quality management 518 may automatically notify a user 515, e.g. a manager or bot configurator, about bot update recommendations. User 515, e.g. a manager or bot configurator, may assess the bot update recommendations. User 515 may assess the update recommendations and/or may approve the update recommendations. In an embodiment, bot update recommendations may be automatically assessed, e.g. using computer system 503. When the bot update recommendations are assessed negative, a bot may not be updated. When the bot update recommendations are assessed positive, a bot update may be initiated. Alternatively, computer system 503 may be configured to automatically update the received bot recommendations, e.g. via bot calibration form interface shown in FIG. 5C, in the bot conversational flow.

For example, in calibration flow, a plurality of users is provided with collected bot interaction data items and/or bot performance metrics for which a recommendation for a bot update is requested. A plurality of users may generate bot update recommendations 511 by assessing a bot interaction, e.g. a transcript of an interaction between a bot and a customer, using a bot update recommendation interface, e.g. a form. A plurality of users may generate recommendations for a bot update by reviewing predefined recommendation options such as "Password Reset Steps", "Customer greeting", "Website recommendation", "Chat closure". Alternatively, a plurality of users may generate a recommendation for a bot update without predefined recommendation options.

For example, a user may generate bot update recommendations by reviewing a transcript of a chat interaction between a bot and a customer, e.g. using quality management system 424 as shown in FIG. 4, and generating a bot interaction evaluation form. A user may submit a calibration form, such as review score along with the review feedback as a text comment, which can be used for improving the bot conversational flow. A calibration form may then be assessed by a user during bot quality management.

A user 515, e.g. a manager or bot configurator, has assessed bot update recommendations for a bot as positive, a user 515 may initiate a bot update. In an embodiment, a bot update may be initiated automatically, e.g. using computer system 503. A bot update may be initiated automatically, e.g. using a bot builder system.

For example, a bot builder system, e.g. a conversational bot builder system, may allow a user to initiate a bot update for a bot. For example, a user may use a conversational bot builder system to carry out a bot update.

In an example use case, evaluation of bot performance may be carried out by a computing device, e.g. computing device 300 executing a software application, such as a reporting application (e.g. a Microstrategy, Tableau or a Power Bot Interaction reporting application).

Figure 6:
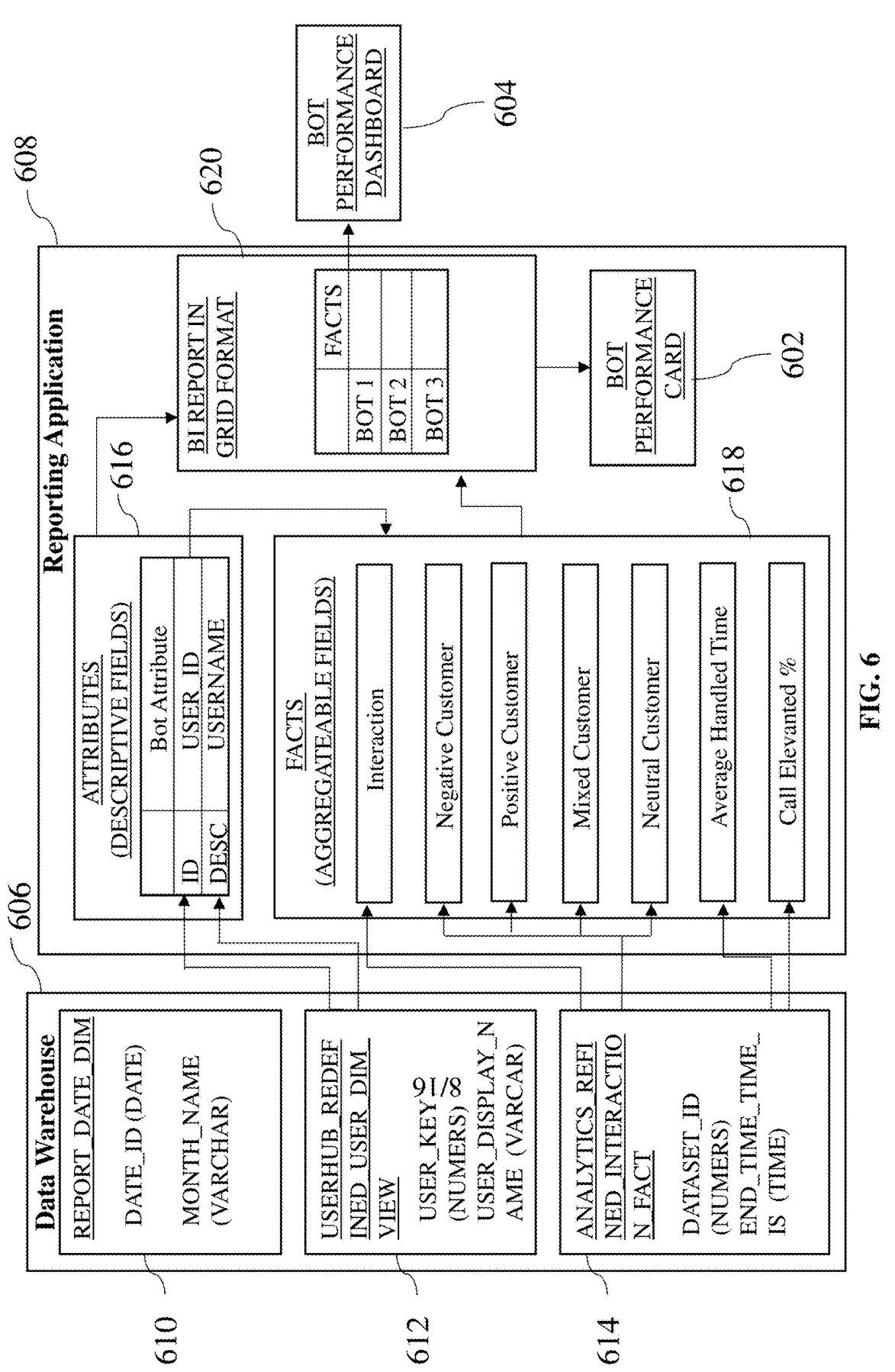
FIG. 6 is a high-level block diagram showing the calculation of bot performance output, e.g. as a performance card or as a bot performance dashboard, according to embodiments of the present invention.

In FIG. 6, a high-level block diagram showing the calculation of bot performance output, e.g. as a performance card 602 or as a bot performance dashboard 604 is depicted.

Bot interaction data items, e.g. interaction metadata and analytics results, may be collected from a database, e.g. a data warehouse 606, and may be retrieved by a reporting software application, e.g. reporting application 608.

For example, a reporting application 608 can be a bot interaction reporting application that collects bot performance data items and bot performance metrics, e.g. a bot interaction report. The collection of bot performance data items may include the calculation of bot performance data items based on collected bot performance metrics.

Bot performance data items may be presented to a user in form of an application programming interface, e.g. a bot performance dashboard 604 or as bot performance cards 602. An example for a bot performance dashboard 604 is bot performance dashboard 150 shown in FIG. 1B.

A database, e.g. a data warehouse 606, may store collected bot interaction data items and bot performance metrics that can be used for the calculation of several bot performance data items, e.g. bot performance KPIs.

Bot interaction data items and/or bot performance metrics stored in a database may be stored in a database in form of dimension tables, e.g. dimension tables 610, 612 and 614. Dimension tables are used for storing data about multiple entities in the system such as user, dates, tenants.

Attributes, e.g. attributes 616, and facts, e.g. fact tables 618, may be a representation of bot interaction data items created by a reporting software application, e.g. a microstrategy (MSTR) reporting application. A reporting application, such as a bot interaction reporting application 608, may create bot interaction data items in form of attributes, e.g. attributes 616, that are descriptive fields.

Attributes may hold data that describes an entity in the system, such as user and month. For example, one or more attributes, such as USER_ID and USERNAME, may be linked to bot attributes and may characterize bots, e.g. via an identifier or a bot name. A reporting application, such as a bot Interaction, may create FACTS, e.g. facts 618. FACTS may be bot interaction data items that are calculated from collected bot performance metrics and may be displayed in form of fact tables from attributes. Fact tables may be aggregateable fields and may hold calculated bot performance data items, such as customer sentiments or average handle time, and can be aggregated in dimension tables.

A reporting application, e.g. reporting application 608, may access collected bot interaction data items, such as interaction metadata and analytics results, stored in a database, e.g. data warehouse and extracts data from collected bot interaction data that allows to calculate other bot interaction data items, in form of facts and attributes.

For example, bot interaction data items stored in a database, e.g. database 606, may include bot interaction data items and/or bot performance metrics such as dates for a bot customer interaction, bot user identifier, start time of a bot customer interaction in dimension tables:

Dimension table Reports.Dates_Dim. may define dates, e.g. for a bot customer interaction which can be used, e.g. by reporting application 608, for filtering data and also for display purposes, e.g. a number of a calendar week.

Dimension table USERHUB_REFINED.USER_DIM_VIEW may include information about bot, e.g. a bot identifier or a username.

Dimension table ANALYTICS_REFINED.INTERACTIONS_FACT may include results of the analysis done on the interactions. Results in a dimension table ANALYTICS_REFINED.INTERACTIONS_FACT may provide data that can be used, e.g. by the reporting application 608, for the calculation of bot performance data items, e.g. bot performance indicators such as customer sentiment and analytics categories for each interaction.

Fact tables, e.g. fact table 618, may be used to store calculated bot performance data items in form of transactional data, such as interaction analytics results. Thereby, collected bot interaction metrics, e.g. in form of attributes or facts, may be processed by a reporting application to calculate bot performance data items, e.g. a bot interaction report 620. Bot performance data items, e.g. in form of a bot interaction report, may allow a reporting application to produce a bot performance output, e.g. displaying bot performance data items via a reporting application programming interface such as a bot performance dashboard 604, a bot performance card 602 or a bot interaction report user interface to a user.

For example, within collected bot interaction data items and bot performance metrics, data items and performance metrics related to interaction metadata, e.g. attribute END_TIME_DATE_ID_DATE, may be analyzed by a bot interaction reporting application. Attribute END_TIME_DATE_ID_DATE may include a value concerning the duration of a bot and a customer interaction. The parameter may be used in the generation of a formula for the calculation of bot interaction data items, for example by generating the fact "Average Handling Time" and enable the calculation of corresponding KPI values for the fact. Values for attribute END_TIME_DATE_ID_DATE may be assessed for a bot to calculate an average value for the time in which a bot was engaged in a customer bot interaction for a specific bot. A bot interaction data item in form of an average value for the AHT may be introduced in a bot interaction report.

For the calculation of bot performance items from directly collected bot interaction metrics, created facts in a reporting application 608, e.g. an MSTR reporting application, may define formulas for calculating a bot interaction data item in form of a facts. Fact values may be calculated values from previously collected bot interaction metrics. The calculation of fact values may proceed via formulas defined for bot performance data items in a reporting application, e.g. an MSTR reporting application.

For example, calculation of bot performance data items may proceed using collected bot performance metrics and interaction analytics results, retrieved by an interaction manager or a chat bot transcript recorder, such as Cxone application such as ACD and interaction analytics. For example, bot performance data items may include key performance indicators (KPIs), customer satisfaction score, customer sentiment, analytics categories, number of calls elevated to real agents (elevation %), average handling time (AHT). After calculation of the bot performance data items, they may be displayed to a user in form of an interface, e.g. a bot performance dashboard:

Interaction Handle Over a Month:

This bot interaction data item may indicate how many customer interactions were handled by the bot over a time period of a month:

Interaction handle over month=countOf(Interactions)
group by month                              Formula 1

Customer Sentiments:

Bot interaction data item "customer sentiments", e.g. represented by attribute clientSentimentId, may relate to or measure the opinion of a customer of an interaction handled by a bot, e.g. input to customer terminal 501, depicted in FIG. 5A.

clientSentimentId is the attribute of interaction entity that represent the sentiment value of an interaction. In one example it can have four values, as outlined in example Table 1:

<table>
<tr><td>17</td><td>18</td></tr>
</table>

TABLE 1

| Sentiment value of an interaction | |
|---|---|
| Value of clientSentimentId | Meaning |
| 0 | Negative Sentiment |
| 1 | Positive Sentiment |
| 2 | Mixed Sentiment |
| 3 | Neutral Sentiment |

A customer may report a negative customer sentiment in the case a customer experienced a negative interaction with a bot in a bot customer interaction. E.g. a bot did not provide the customer with an answer to a question asked by the customer.

Negative customer sentiment %: This value for the bot interaction data item customer sentiment may indicate out of all the interactions handled by a bot, how many interactions have been reported by customers as a negative customer sentiment and may be calculated by example Formula 2:

$$\text{Negative customer sentiment } \% = (\text{countOf(Interaction with clientSentimentId=0)/countOf(Interaction))} * 100 \qquad \text{Formula 2}$$

A customer may report a positive customer sentiment in the case a customer experienced a positive interaction with a bot in a bot customer interaction. E.g. a bot provided the customer with an answer to a question asked by the customer.

Positive customer sentiment %: This value for the bot interaction data item customer sentiment may indicate out of all the interactions handled by the bot, how many interactions have been reported by customers as a positive customer sentiment and may be calculated by example Formula 3:

$$\text{Positive customer sentiment } \% = (\text{countOf(Interaction with clientSentimentId=1)/countOf(Interaction))} * 100 \qquad \text{Formula 3}$$

A customer may report a mixed customer sentiment in the case a customer experienced a mixed interaction with a bot in a bot customer interaction. E.g. a bot provided the customer with an answer to a question asked by the customer, but did not provide sufficient detail in the answer.

Mixed customer sentiment %: This value for the bot interaction data item customer sentiment may indicate out of all the interactions handled by the bot, how many interactions have been reported by customers as a mixed customer sentiment and may be calculated by example Formula 4:

$$\text{Mixed customer sentiment } \% = \qquad \text{Formula 4}$$
$$(countOf \text{ (Interaction with } clientSentimentId =$$
$$2)/countOf \text{ (Interaction))} * 100$$

A customer may report a neutral customer sentiment in the case a customer experienced a neutral interaction with a bot in a bot customer interaction. E.g. a customer did not ask a question and, thus, a bot did not provide an answer.

Neutral customer sentiment %: This value for the bot interaction data item customer sentiment may indicate out of all the interactions handled by the bot how many interactions have been reported by customers as a neutral customer sentiment and may be calculated by example Formula 5:

$$\text{Neutral customer sentiment } \% = \qquad \text{Formula 5}$$
$$(countOf \text{ (Interactions with } clientSentimentId =$$
$$3)/countOf \text{ (Interactions))} * 100$$

Average Handled Time (AHT):

This value for the bot interaction data item "average handling" time may indicate an average time of all the customer interactions handled by the bot, e.g. input to customer terminal 501 depicted in FIG. 5A, and may be calculated by example Formula 6:

$$AHT = \text{Average (Duration of interaction)} \qquad \text{Formula 6}$$

Where duration of interaction is in seconds, calculated by subtracting interaction start time from interaction end time. Calls Elevated %:

This value for the bot interaction data item "call elevated %" may indicate that out of total interaction handled by bot, how many interactions were elevated/routed to a user, e.g. real agent such as user 515 using computing device 503. This may indicate that the bot was not sufficient for handling customer interaction and real agent had to intervene. Calls Elevated % may be calculated by example Formula 7:

$$\text{Calls Elevated } \% = \qquad \text{Formula 7}$$
$$(countOf \text{ (Interactions with } elevatedToAgentId =$$
$$1)/countOf \text{ (Interactions))} * 100$$

An elevatedToAgentId value of "1" may indicate that an interaction was elevated to a real agent. An elevatedToAgentId value of "0" may indicate that it was no elevated to a real agent.

Other bot interaction data items or bot interaction metrics, e.g. in form of KPI values may be collected and some bot performance data may be calculated based on collected bot interaction metrics.

Simulation of KPI Calculation:

The below table shows sample bot interaction data items which are directly collected from various call center applications and may be used in the calculation of bot interaction data items, e.g. KPI values.

TABLE 2

| Example data set for KPI value calculation: | | | | | | | |
|---|---|---|---|---|---|---|---|
| interactionID | startTimeDateID | channelTypeId | duration | agentId | teamId | elevatedToAgentId | clientSentimentId |
| interaction 1 | Aug. 17, 2022 | 2 | 282 | 22 | 313 | 0 | 1 |
| interaction 2 | Aug. 17, 2022 | 2 | 225 | 22 | 313 | 0 | 1 |
| interaction 3 | Aug. 17, 2022 | 2 | 201 | 22 | 313 | 0 | 3 |

TABLE 2-continued

Example data set for KPI value calculation:

| interactionID | startTimeDateID | channelTypeId | duration | agentId | teamId | elevatedToAgentId | clientSentimentId |
|---|---|---|---|---|---|---|---|
| interaction 4 | Sep. 20, 2022 | 2 | 152 | 22 | 313 | 1 | 0 |
| interaction 5 | Sep. 20, 2022 | 2 | 229 | 33 | 313 | 1 | 2 |
| interaction 6 | Aug. 22, 2022 | 3 | 245 | 33 | 313 | 1 | 2 |
| interaction 7 | Aug. 22, 2022 | 3 | 225 | 44 | 313 | 1 | 2 |
| interaction 8 | Aug. 22, 2022 | 3 | 206 | 44 | 313 | 1 | 0 |
| interaction 9 | Sep. 23, 2022 | 3 | 169 | 44 | 313 | 1 | 2 |
| interaction 10 | Sep. 23, 2022 | 3 | 214 | 44 | 313 | 0 | 2 |
| interaction 11 | Aug. 27, 2022 | 1 | 294 | 55 | 414 | 0 | 3 |
| interaction 12 | Aug. 27, 2022 | 1 | 235 | 55 | 414 | 0 | 1 |
| interaction 13 | Aug. 27, 2022 | 1 | 150 | 55 | 414 | 0 | 1 |
| interaction 14 | Sep. 30, 2022 | 1 | 197 | 66 | 414 | 0 | 1 |
| interaction 15 | Sep. 30, 2022 | 1 | 204 | 66 | 414 | 1 | 2 |

Calculation of Values for the Bot Interaction Data Item "Interaction Handle Over Month":

For example, a bot "agent ID 22" had 3 interactions in August 22 and 1 interaction in September 22.

Calculation of Values for the Bot Interaction Data Item "Customer Sentiments":

Negative customer sentiment % for agent ID 22 can be calculated using Formula 2:

countOf(Interaction with clientSentimentId=0)=1// as agent ID 22 has only 1 interaction for which client-SentimentId column value is 0.

countOf(Interaction)=4//as agent ID 22 has a total of 4 interactions:

Negative customer sentiment % for Agent 22=(1/4)
*100=25%

Positive customer sentiment % for Agent 22 can be calculated as below using Formula 3:

countOf(Interaction with clientSentimentId=1)=2// as this agent ID 22 has only 1 interaction for which clientSentimentId column value is 1 countOf(Interaction)=4//as agent ID 22 has total 4 interactions

Positive customer sentiment % for Agent 22=(2/4)
*100=50%

Mixed customer sentiment % for Agent 22 can be calculated as below using Formula 4:

countOf(Interaction with clientSentimentId=2)=0// as agent ID 22 has only 1 interaction for which client-SentimentId column value is 2 countOf(Interaction)=4//as agent ID 22 has total 4 interactions

Mixed customer sentiment % for Agent 22=(0/4)
*100=0%

Neutral customer sentiment % for Agent 22 can be calculated as below using Formula 5:

countOf(Interaction with clientSentimentId=3)=1// as agent ID 22 has only 1 interaction for which client-SentimentId column value is 3 countOf(Interaction)=4//as agent ID 22 has total 4 interactions

Neutral customer sentiment % for Agent 22=(1/4)
*100=0%

Calculation of values for the bot interaction data item "Average Handling Time":

Average Handle Time for Agent 22 can be calculated as below using Formula 6:

Average Handle Time for Agent 22=Avg(282,225, 201,152)=215

Calculation of Values for the Bot Interaction Data Item "Elevated Calls %":

Calls Elevated % for Agent 22 can be calculated as below using Formula 7:

countOf(Interactions with elevatedToAgentId=1)=1// as agent ID 22 has only 1 interaction for which elevatedToAgentId column value is 1 countOf(Interaction)=4//as agent ID 22 has total 4 interactions

Calls Elevated %=(1/4)*100=25%

Table 3 details example calculated values for bot interaction data items, e.g. KPI values for bots, such as bot agents 22, 33, 44, 55 66; the calculated values in Table 3 may be bot interaction data items which are calculated based on bot metrics, which may be underlying data collected from bot activity:

TABLE 3

Example data set for KPI value calculation

| Agent_ID | Interaction handle over month | | Negative customer sentiment % | Positive customer sentiment % | Mixed customer sentiment % | Neutral customer sentiment % | Average Handled time (AHT) in sec | Calls Elevated % |
|---|---|---|---|---|---|---|---|---|
| | 22-Aug | 22-Sep | | | | | | |
| 22 | 3 | 1 | 25 | 50 | 0 | 25 | 215 | 25 |
| 33 | 1 | 1 | 0 | 0 | 100 | 0 | 237 | 100 |
| 44 | 2 | 2 | 25% | 0 | 75 | 0 | 204 | 75 |
| 55 | 3 | 0 | 0 | 67 | 33 | 0 | 226 | 0 |
| 66 | 0 | 1 | 0 | 50 | 50 | 0 | 201 | 50 |

Calculated bot performance data items, e.g. calculated by a reporting application, may be used in the production of a bot performance output. For example, a bot performance output may be produced by an application programming interface in form of a bot performance dashboard. Users, e.g. user 515 or an agent using computing device 503, may be presented by a bot performance output and may assess, using the bot performance data, such as KPI results, to evaluate the performance of a bot.

A bot performance dashboard can be a user interface application that uses angular framework and other libraries such as HttpClient, RxJS, highcharts.

A user, e.g. user 515 or an agent using computing device 503, may assess the performance output for a bot as either positive or negative. In case of a negative bot performance, a user, e.g. a manager can start a bot quality management, e.g. bot quality management on bot interaction. Bot quality management may be conducted using a quality management application.

Figure 7:
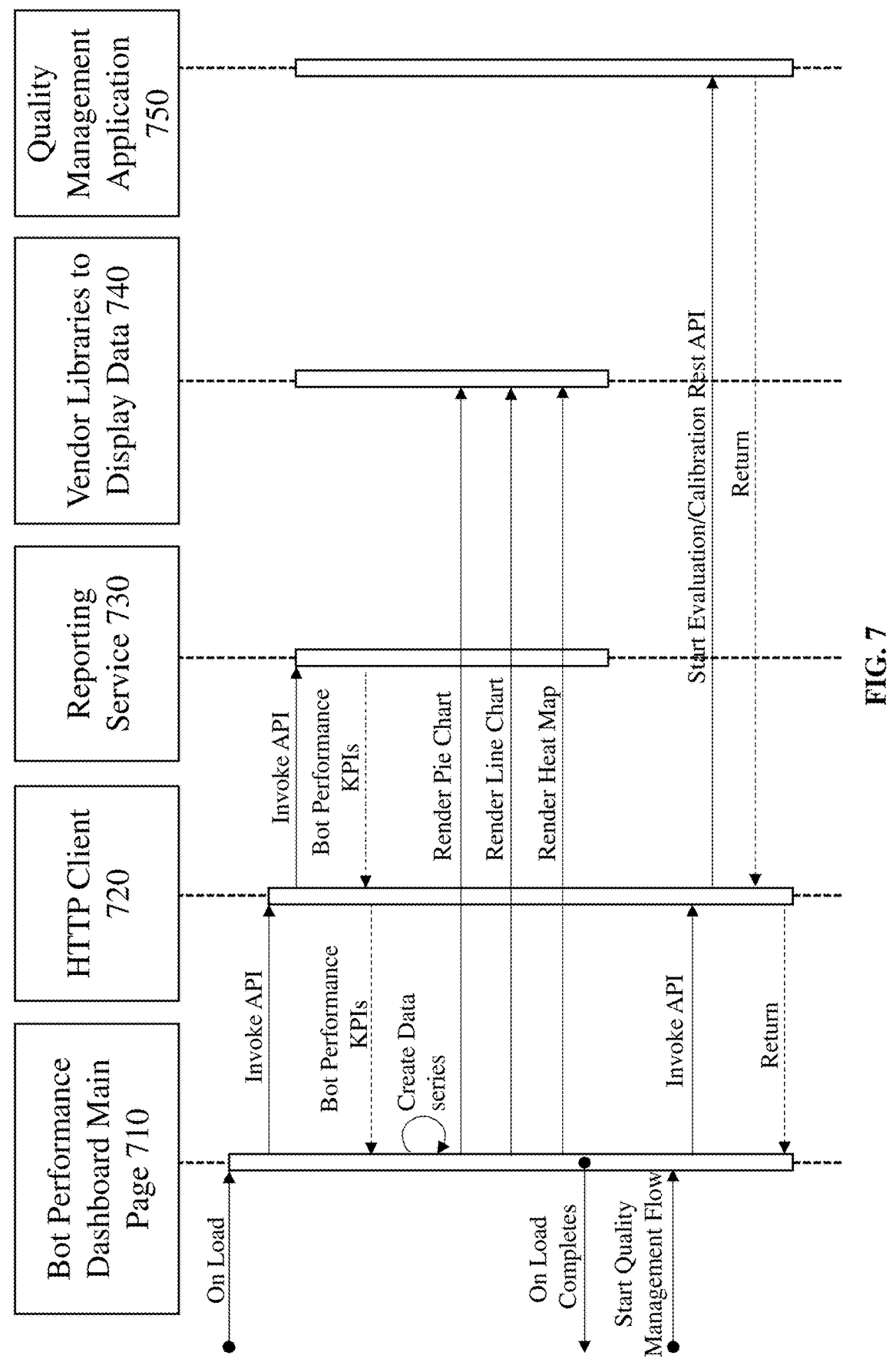
FIG. 7 is a high-level sequence diagram showing the generation of a bot performance dashboard application, according to embodiments of the present invention.

FIG. 7 is a high-level sequence diagram showing the generation of a bot performance dashboard application using libraries such as HttpClient, RxJS, highcharts.

Upon request for an evaluation of a bot performance, a bot performance dashboard main page 710 may access a reporting service 730, e.g. using a HTTP client 720, and may retrieve bot performance data items, e.g. bot performance KPIs. Upon retrieval of the bot performance data items, a bot performance dashboard main page 710 may create a data series: Vendor libraries 740 may be used to display bot performance data items in form of a bot performance output, e.g. using visualization such as a pie chart, line chart or heat map. A bot performance output may be displayed to a user, e.g. user 515 or an agent using computing device 503. Upon initiating bot quality management, a quality management application 750 may be accessed, e.g. via a HTTP client 720, and evaluation/calibration of a quality management application 750 may be initiated. A quality management application may for example be executed by a processor of computing device 503. A quality management application 750 may return bot script update recommendations to the bot performance dashboard that can be used by users to update bot script configurations.

Collected bot interaction data items and/or bot performance metrics, e.g. interaction metadata and interaction analytics results may be analyzed by a software application, e.g. interaction analytics service. A software application may retrieve recorded bot interaction data items, e.g. recorded by an interaction manager as a result of a CTI event. An example for a data structure for the collection of bot interaction data items and/or bot performance metrics, e.g. interaction metadata and interaction analytics results, is shown below:

Interaction Metadata:
{
    "interactionId": "ad86d017-19a7-405f-be50-90de2035213d",
    "channelTypeId": 4,
    "startTime": "2022-09-17 17:28:12.654 +0000",
    "startTimeTimeId": "17:28:00",
    "startTimeDateId": "2022-09-17",
    "endTime": "2022-09-17 17:37:26.781 +0000",
    "endTimeTimeId": "17:37:00",
    "endTimeDateId": "2022-09-17",
    "duration": 205,
    "silence": 0,
    "resolutionId": 2,
    "agentId": "11e76639-3351-8900-9ff6-0242ac110004",
    "teamId": "11ea9b57-7e2f-23a0-a946-0242ac110005",
    "skillNo": 1111,
    "elevatedToAgentId": 1,
    "tenantId": "11ed1163-441d-0360-ac0b-0242ac110005",
    "createdTimestamp": "2022-09-17 19:08:16.259 +0000",
    "modifiedTimestamp": "2022-09-18 21:09:16.259 +0000"
}
Interaction Analysis Result:
{
    "interactionid": "ad86d017-19a7-405f-be50-90de2035213d",
    "categoryPathId": 1674967410397545470,
    "categoryPath": "agent performance/first-contact-resolution-issues/issue not resolved",
    "startTime": "2022-09-17 17:28:12.654 +0000",
    "endTime": "2022-09-17 17:37:26.781 +0000",
    "agentSentimentId": 1,
    "agentBeginSentimentId": 2,
    "agentEndSentimentId": 2,
    "clientSentimentId": 1,
    "clientBeginSentimentId": 2,
    "clientEndSentimentId": 1,
    "clientFrustrationId": 1,
    "resolutionId": 2,
    "agentId": "11e76639-3351-8900-9ff6-0242ac110004",
    "teamId": "11ea9b57-7e2f-23a0-a946-0242ac110005",
    "tenantId": "11ed1163-441d-0360-ac0b-0242ac110005",
    "createdTimestamp": "2022-09-17 19:08:16.259 +0000",
    "modifiedTimestamp": "2022-09-18 21:09:16.259 +0000"
}

An example bot interaction data item, e.g. a transcript of an interaction between a bot, e.g. bot 502, and a customer, e.g. via customer terminal 501, is shown below. The transcript may be stored on a database, e.g. a chat transcripts database.

Transcript:
{
    "id": 124553,
    "interactionId": "ad86d017-19a7-405f-be50-90de2035213d",
    "tenantId": "11ed1163-441d-0360-ac0b-0242ac110005",
    "massages": [
        {

-continued

```
    "id": 1,
    "senderType": "customer",
    "senderId": "customer@socialmedia.com",
    "msg": "I need help with password",
    "timestamp": "2022-09-17 19:08:16.259"
},
{
    "id": 1,
    "senderType": "bot",
    "senderId": "QbotM",
    "msg": "Sure, how can I help you?",
    "timestamp": "2022-09-17 19:08:16.712"
},
{
    "id": 1,
    "senderType": "customer",
    "senderId": "customer@socialmedia.com",
    "msg": "I forgot my password",
    "timestamp": "2022-09-17 19:08:21.349"
},
{
    "id": 1,
    "senderType": "bot",
    "senderId": "QbotM",
    "msg": "I'm sorry to hear that. You can reset it at our website
https://nice.com",
    "timestamp": "2022-09-17 19:08:29.456"
    }
]
}
```

An example for a data structure for the initiation of a bot quality management application that may be executed by a processor of computing device 503 is shown below. A bot quality management may be used, e.g. to generate bot update recommendations based on the assessment of feedback for a bot user interaction:

```
Evaluation Results - Bot Update Recommendations:
{
    "evaluationid": "ad86d017-19b5-405f-be50-90de2035235a",
    "interactionid": "ad86d017-19a7-405f-be50-90de2035213d",
    "evaluationSubmissionTime": "2022-09-17 17:28:12.654 +0000",
    "evaluatorId": "11e76639-3351-8900-9ff6-0242ac110004",
    "tenantId": "11ed1163-441d-0360-ac0b-0242ac110005",
    "createdTimestamp": "2022-09-17 19:08:16.259 +0000",
    "modifiedTimestamp": "2022-09-18 21:09:16.259 +0000"
    "evalutionFormId" : "bd86d017-19a7-678f-be50-90de2035213d",
    "recommendations":[
        {
            "id":1,
            "botResponseId":"58f35ac8-a378-4c1d-a9d2-f1d5688346ad",
            "updateRecommendation":"
            Recommend the Password reset steps "
        }
    ]
}
```

An example of an interface, e.g. a bot performance interface, for calculated bot performance data items, such as bot performance KPIs, is shown below. The performance of a bot may be evaluated by a user who is presented with a produced performance output, comprising bot performance data items, and may assess the bot performance data items of the performance output, such as "negative customer sentiment", "Average handling Time" and "Calls Elevated".

```
Bot Performance KPIs:
{
    "botId": "ad86d017-19a7-405f-be50-90de2035213d",
    "botName": "ad86d017-19a7-405f-be50-90de2035213d",
    "tenantId": "11ed1163-441d-0360-ac0b-0242ac110005",
    "createdTimestamp": "2022-09-17 19:08:16.259 +0000",
    "modifiedTimestamp": "2022-09-18 21:09:16.259 +0000"
    "startTime": "2022-09-17 17:28:12.654 +0000",
    "endTime": "2022-10-17 17:37:26.781 +0000",
    "kpis":[
        {
            "kpi":"negative_customer_sentiment_%",
            "value":65
        },
        {
            "kpi":"aht",
            "value":600
        },
        {
            "kpi":"call_elevated_%",
            "value":60
        }
    ]
}
```

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

What claimed is:

1. A method of evaluating bot performance, the method comprising:
assigning, by an automated caller dialer (ACD), one or more interactions to a bot, each of the one or more interactions comprising a connection between the bot and a first computing device;
establishing, by the ACD, the connection between the bot and the first computing device;
collecting, by a processor, bot performance data items, the performance data items generated during one or more of the assigned interactions, wherein the collecting comprises:
directly collecting from the bot bot performance data items; and
calculating bot performance data items based on collected bot performance metrics;
producing a bot performance output comprising bot performance data items;
assessing, by a second computing device, the bot performance output, the assessing of the bot performance output using a bot calibration form, wherein the bot calibration form comprises one or more update recommendations, and wherein the bot calibration form is linked to one or more of the interactions using a unique identifier; and
in response to the bot performance output being assessed negative, automatically amending source code of the bot based on an identifier to link a bot reply message, wherein the amending of the source code of the bot is performed using one or more of the update recommendations.

2. A method according to claim 1, wherein bot performance metrics are directly collected from bot-customer interactions.

3. A method according to claim 1, wherein bot performance metrics are generated from bot-customer interaction transcripts using natural language processing.

4. A method according to claim 1, comprising:
at the processor, retrieving bot update recommendations generated from collected bot performance data items and bot performance metrics.

5. A method according to claim 4, wherein bot update recommendations comprise modification of bot source code.

6. A method according to claim 1, wherein assessing the bot performance output comprises assessing the bot performance data items.

7. A method according to claim 4, wherein the bot update recommendations are generated from data from a quality management system, wherein the data comprises one or more of: manual bot evaluation data, automated bot evaluation data and bot calibration data.

8. A system for evaluating bot performance, the system comprising:
a computing device;
a memory; and
a processor, the processor configured to:
assign, by an automated caller dialer (ACD), one or more interactions to a bot, each of the one or more interactions comprising a connection between the bot and a first computing device;
establish, by the ACD, the connection between the bot and the first computing device;
collect bot performance data items, the performance data items generated during one or more of the assigned interactions, wherein collecting comprises:
directly collecting from the bot bot performance data items; and calculating bot performance data items based on collected bot performance metrics;

produce a bot performance output comprising bot performance data items;

assess, by a second computing device, the bot performance output, the assessing of the bot performance output using a bot calibration form, wherein the bot calibration form comprises one or more update recommendations, and wherein the bot calibration form is linked to one or more of the interactions using a unique identifier; and perform one of:

in response to the bot performance output being assessed negative, automatically amend source code of the bot based on an identifier to link a bot reply message, wherein the amending of the source code of the bot is performed using one or more of the update recommendations.

9. A system according to claim 8, wherein assessing the bot performance output comprises assessing the bot performance data items.

10. A system according to claim 8, wherein the processor is configured to:

retrieve bot update recommendations.

11. A system according to claim 10, wherein the bot update recommendations are generated from data from a quality management system, wherein the data comprises one or more of: manual bot evaluation data, automated bot evaluation data and bot calibration data.

12. A method of assessing bot performance, the method comprising:

assigning, by an automated caller dialer (ACD), one or more interactions to a bot, each of the one or more interactions comprising a connection between the bot and a first computing device;

establishing, by the ACD, the connection between the bot and the first computing device;

receiving directly from the bot a first set of bot performance data items, the first set of performance data items generated during one or more of the assigned interactions; and determining a second set performance data items based on collected bot performance metrics;

generating, by a processor using bot performance data items, a bot performance output;

evaluating, by a second computing device, the bot performance output, the evaluating of the bot performance output using a bot calibration form, wherein the bot calibration form comprises one or more update recommendations, and wherein the bot calibration form is linked to one or more of the interactions using a unique identifier; and in response to the bot performance output being evaluated negative, automatically amending source code of the bot based on an identifier to link a bot reply message, wherein the amending of the source code of the bot is performed using one or more of the update recommendations.

13. A method according to claim 12, wherein bot performance metrics are directly collected from bot-customer interactions.

14. A method according to claim 12, wherein evaluating the bot performance output comprises evaluating the bot performance data items.

15. A method according to claim 12, comprising:

at the processor, retrieving bot update recommendations generated from collected bot performance data items and bot performance metrics.

16. A method according to claim 15, wherein bot update recommendations comprise modifying source code or script of a bot.

17. A method according to claim 15, wherein the bot update recommendations are generated from data from a quality management system, wherein the data comprises one or more of: manual bot evaluation data, automated bot evaluation data and bot calibration data.

* * * * *